United States Patent
Suciu et al.

(10) Patent No.: US 10,808,616 B2
(45) Date of Patent: Oct. 20, 2020

(54) METHOD AND APPARATUS FOR HANDLING PRE-DIFFUSER AIRFLOW FOR COOLING HIGH PRESSURE TURBINE COMPONENTS

(71) Applicant: United Technologies Corporation, Hartford, CT (US)

(72) Inventors: Gabriel L. Suciu, Glastonbury, CT (US); William K. Ackermann, East Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 881 days.

(21) Appl. No.: 14/771,038

(22) PCT Filed: Feb. 28, 2014

(86) PCT No.: PCT/US2014/019564
§ 371 (c)(1),
(2) Date: Aug. 27, 2015

(87) PCT Pub. No.: WO2014/134517
PCT Pub. Date: Sep. 4, 2014

(65) Prior Publication Data
US 2016/0010552 A1   Jan. 14, 2016

Related U.S. Application Data

(60) Provisional application No. 61/770,853, filed on Feb. 28, 2013.

(51) Int. Cl.
*F02C 7/18* (2006.01)
*F01D 17/10* (2006.01)
(Continued)

(52) U.S. Cl.
CPC .................. *F02C 7/18* (2013.01); *F01D 5/02* (2013.01); *F01D 9/041* (2013.01); *F01D 9/065* (2013.01);
(Continued)

(58) Field of Classification Search
CPC ...... F23R 3/04; F23R 3/10; F02C 6/08; F02C 7/18
(Continued)

(56) References Cited

U.S. PATENT DOCUMENTS

| 39,689,647 | | 7/1976 | Boudigues |
| 4,055,949 | A | 11/1977 | Boudigues |

(Continued)

FOREIGN PATENT DOCUMENTS

JP   08210152   8/1996

OTHER PUBLICATIONS

Extended European Search Report dated Sep. 30, 2016.

*Primary Examiner* — Scott J Walthour
*Assistant Examiner* — William L Breazeal
(74) *Attorney, Agent, or Firm* — Getz Balich LLP

(57) ABSTRACT

A gas turbine engine is provided that includes a compressor section, a combustor section, a diffuser case module, a turbine section, and a manifold. The diffuser case module includes a multiple of struts within an annular flow path from said compressor section to said combustor section, wherein at least one of said multiple of struts defines a mid-span pre-diffuser inlet in communication with said annular flow path. The manifold is in communication with said mid-span pre-diffuser inlet and said turbine section.

7 Claims, 23 Drawing Sheets

(51) Int. Cl.
  *F02C 6/08*   (2006.01)
  *F01D 9/04*   (2006.01)
  *F01D 9/06*   (2006.01)
  *F02C 7/06*   (2006.01)
  *F02C 7/14*   (2006.01)
  *F01D 5/02*   (2006.01)
  *F02C 3/04*   (2006.01)
  *F02C 7/04*   (2006.01)
  *F01D 25/24*  (2006.01)
  *F04D 29/54*  (2006.01)
  *F01D 25/12*  (2006.01)

(52) U.S. Cl.
  CPC ........... *F01D 17/105* (2013.01); *F01D 25/12* (2013.01); *F01D 25/24* (2013.01); *F02C 3/04* (2013.01); *F02C 6/08* (2013.01); *F02C 7/04* (2013.01); *F02C 7/06* (2013.01); *F02C 7/14* (2013.01); *F04D 29/541* (2013.01); *F05D 2220/32* (2013.01); *F05D 2240/12* (2013.01); *F05D 2240/35* (2013.01); *F05D 2260/20* (2013.01); *F05D 2260/213* (2013.01); *Y02T 50/676* (2013.01)

(58) Field of Classification Search
  USPC .......................................................... 60/751
  See application file for complete search history.

(56) References Cited

U.S. PATENT DOCUMENTS

| | | | |
|---|---|---|---|
| 4,093,122 A | 6/1978 | Linderman et al. | |
| 4,180,974 A | 1/1980 | Stenger et al. | |
| 4,209,993 A | 1/1980 | Rannenberg | |
| 4,527,386 A | 7/1985 | Markowski | |
| RE32,100 E | 4/1986 | Rannenberg | |
| 4,711,084 A | 12/1987 | Brockett | |
| 4,823,712 A | 4/1989 | Wormer | |
| 4,873,822 A | 10/1989 | Benaroya | |
| 5,127,795 A | 7/1992 | Plemmons et al. | |
| 5,163,285 A | 11/1992 | Mazeaud et al. | |
| 5,211,003 A | 5/1993 | Samuel | |
| 5,224,819 A * | 7/1993 | Kernon | F01D 9/041 415/115 |
| 5,349,811 A | 9/1994 | Stickler et al. | |
| 5,387,081 A | 2/1995 | LeBlanc | |
| 5,438,756 A | 8/1995 | Halchak et al. | |
| 5,555,721 A | 9/1996 | Bourneuf et al. | |
| 5,619,855 A | 4/1997 | Burrus | |
| 5,632,141 A | 5/1997 | Sloop et al. | |
| 5,771,681 A | 6/1998 | Rudolph | |
| 6,123,506 A | 9/2000 | Brand et al. | |
| 6,250,061 B1 | 6/2001 | Orlando | |
| 6,280,139 B1 | 8/2001 | Romani et al. | |
| 6,334,297 B1 | 1/2002 | Dailey et al. | |
| 6,457,305 B1 | 10/2002 | Schierbaum | |
| 6,471,216 B1 | 10/2002 | Brainch et al. | |
| 6,471,475 B1 | 10/2002 | Sasu et al. | |
| 6,481,211 B1 | 11/2002 | Haas | |
| 6,508,061 B2 | 1/2003 | Stuttaford | |
| 6,530,225 B1 | 3/2003 | Hadder | |
| 6,694,743 B2 | 2/2004 | Lawlor et al. | |
| 6,701,715 B2 | 3/2004 | Anderson et al. | |
| 6,760,971 B2 | 7/2004 | Sasu et al. | |
| 6,782,620 B2 | 8/2004 | Caldwell et al. | |
| 6,923,616 B2 | 8/2005 | McRae, Jr. et al. | |
| 7,003,961 B2 | 2/2006 | Kendrick et al. | |
| 7,025,565 B2 | 4/2006 | Urso et al. | |
| 7,025,566 B2 | 4/2006 | Sasu et al. | |
| 7,114,255 B2 | 10/2006 | Sasu et al. | |
| 7,152,864 B2 | 12/2006 | Amos et al. | |
| 7,156,618 B2 | 1/2007 | Fish et al. | |
| 7,159,402 B2 | 1/2007 | Hein et al. | |
| 7,210,900 B2 | 5/2007 | Urso et al. | |
| 7,547,002 B2 | 6/2009 | Mao et al. | |
| 7,581,397 B2 | 6/2009 | Strangman et al. | |
| 7,607,286 B2 * | 10/2009 | Suciu | F01D 5/022 415/115 |
| 7,700,167 B2 | 4/2010 | Golecki | |
| 7,758,306 B2 | 7/2010 | Burton et al. | |
| 7,805,947 B2 | 10/2010 | Moulebhar | |
| 7,806,653 B2 | 10/2010 | Burton et al. | |
| 7,811,050 B2 | 10/2010 | Roth | |
| 7,823,375 B2 | 11/2010 | Zack et al. | |
| 7,836,701 B2 | 11/2010 | Zack et al. | |
| 8,074,895 B2 | 12/2011 | Mao et al. | |
| 8,092,164 B2 | 1/2012 | Moon et al. | |
| 8,100,643 B2 | 1/2012 | LeBlanc et al. | |
| 8,105,019 B2 | 1/2012 | McCaffrey et al. | |
| 8,141,366 B2 | 3/2012 | Zamora et al. | |
| 8,206,102 B2 | 6/2012 | Moon | |
| 8,221,062 B2 | 7/2012 | Liotta et al. | |
| 8,235,648 B2 | 8/2012 | LeBlanc | |
| 8,240,126 B2 | 8/2012 | Schirtzinger | |
| 8,286,416 B2 | 10/2012 | Schirtzinger et al. | |
| 2006/0034685 A1 * | 2/2006 | Kizuka | F01D 5/081 415/191 |
| 2008/0112798 A1 | 5/2008 | Seitzer et al. | |
| 2008/0134657 A1 * | 6/2008 | DiBenedetto | F01D 9/065 60/39.08 |
| 2008/0310955 A1 * | 12/2008 | Norris | F02C 7/14 415/178 |
| 2009/0133401 A1 | 5/2009 | Suciu et al. | |
| 2010/0092116 A1 * | 4/2010 | Franconi | F01D 25/125 384/317 |
| 2010/0162713 A1 | 7/2010 | Li et al. | |
| 2010/0263382 A1 | 10/2010 | Mancini et al. | |
| 2011/0088405 A1 * | 4/2011 | Turco | F01D 5/081 60/782 |
| 2012/0186258 A1 | 7/2012 | Dai et al. | |
| 2012/0282079 A1 | 11/2012 | Glahn et al. | |

\* cited by examiner

METHOD AND APPARATUS FOR HANDLING PRE-DIFFUSER AIRFLOW FOR COOLING HIGH PRESSURE TURBINE COMPONENTS This application claims priority to PCT Patent Application No. PCT/US14/19564 filed Feb. 28, 2014, which claims priority to U.S. Patent Appln. No. 61/770,853 filed Feb. 28, 2013.

BACKGROUND

The present disclosure relates to a gas turbine engine and, more particularly, to a cooling architecture therefor.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

Thermal loads within the gas turbine engine vary. Such variance may affect performance even within the bounds of material specifications.

SUMMARY

A diffuser for a gas turbine engine according to one disclosed non-limiting embodiment of the present disclosure includes an outer shroud, an inner shroud, a multiple of struts between said outer shroud and said inner shroud to define an annular flow path, and a mid-span pre-diffuser inlet in communication with said annular flow path.

In a further embodiment of the foregoing embodiment, the mid-span pre-diffuser inlet includes an inlet directed generally parallel to a core airflow thru said annular flow path.

In a further embodiment of any of the foregoing embodiments, the mid-span pre-diffuser inlet includes an inlet on both sides of an outer airfoil wall surface of at least one of said multiple of struts.

In a further embodiment of any of the foregoing embodiments, the mid-span pre-diffuser inlet includes an inlet on one side of an outer airfoil wall surface of at least one of said multiple of struts.

In a further embodiment of any of the foregoing embodiments, the mid-span pre-diffuser inlet is a NACA inlet. In the alternative or additionally thereto, in the foregoing embodiment the NACA inlet provides a capacity of approximately 0%-2.5% of a core airflow.

In a further embodiment of any of the foregoing embodiments, the mid-span pre-diffuser inlet is a ram inlet. In the alternative or additionally thereto, in the foregoing embodiment the ram inlet provides a capacity of approximately 2.5%-5% of a core airflow.

In a further embodiment of any of the foregoing embodiments, the mid-span pre-diffuser inlet is an annular inlet. In the alternative or additionally thereto, in the foregoing embodiment the annular inlet provides a capacity of approximately 10%-20% of a core airflow. In the alternative or additionally thereto, in the foregoing embodiment the annular inlet is located circumferentially between each of said multiple of struts.

In a further embodiment of any of the foregoing embodiments, the diffuser includes a manifold in communication with said mid-span pre-diffuser inlet. In the alternative or additionally thereto, in the foregoing embodiment the manifold communicates a temperature tailored airflow.

A gas turbine engine according to another disclosed non-limiting embodiment of the present disclosure includes a compressor section, a combustor section, a diffuser case module with a multiple of struts within an annular flow path from said compressor section to said combustor section, at least one of said multiple of struts defines a mid-span pre-diffuser inlet in communication with said annular flow path, and a manifold in communication with said mid-span pre-diffuser inlet.

In a further embodiment of the foregoing embodiment, the manifold is in communication with a region of the gas turbine engine to supply a temperature tailored airflow thereto.

A method of communicating an airflow within a gas turbine engine according to another disclosed non-limiting embodiment of the present disclosure includes tapping a pre-diffuser airflow.

In a further embodiment of the foregoing embodiment, the method includes communicating the pre-diffuser airflow thru at least one of a multiple of struts.

In a further embodiment of any of the foregoing embodiments, the method includes communicating the pre-diffuser airflow thru at least one of a multiple of struts at a radial mid-strut location.

In a further embodiment of any of the foregoing embodiments, the method includes communicating the pre-diffuser airflow thru an annular inlet which extends between a multiple of struts.

In a further embodiment of any of the foregoing embodiments, the method includes tapping between 0%-20% of a compressor section airflow.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
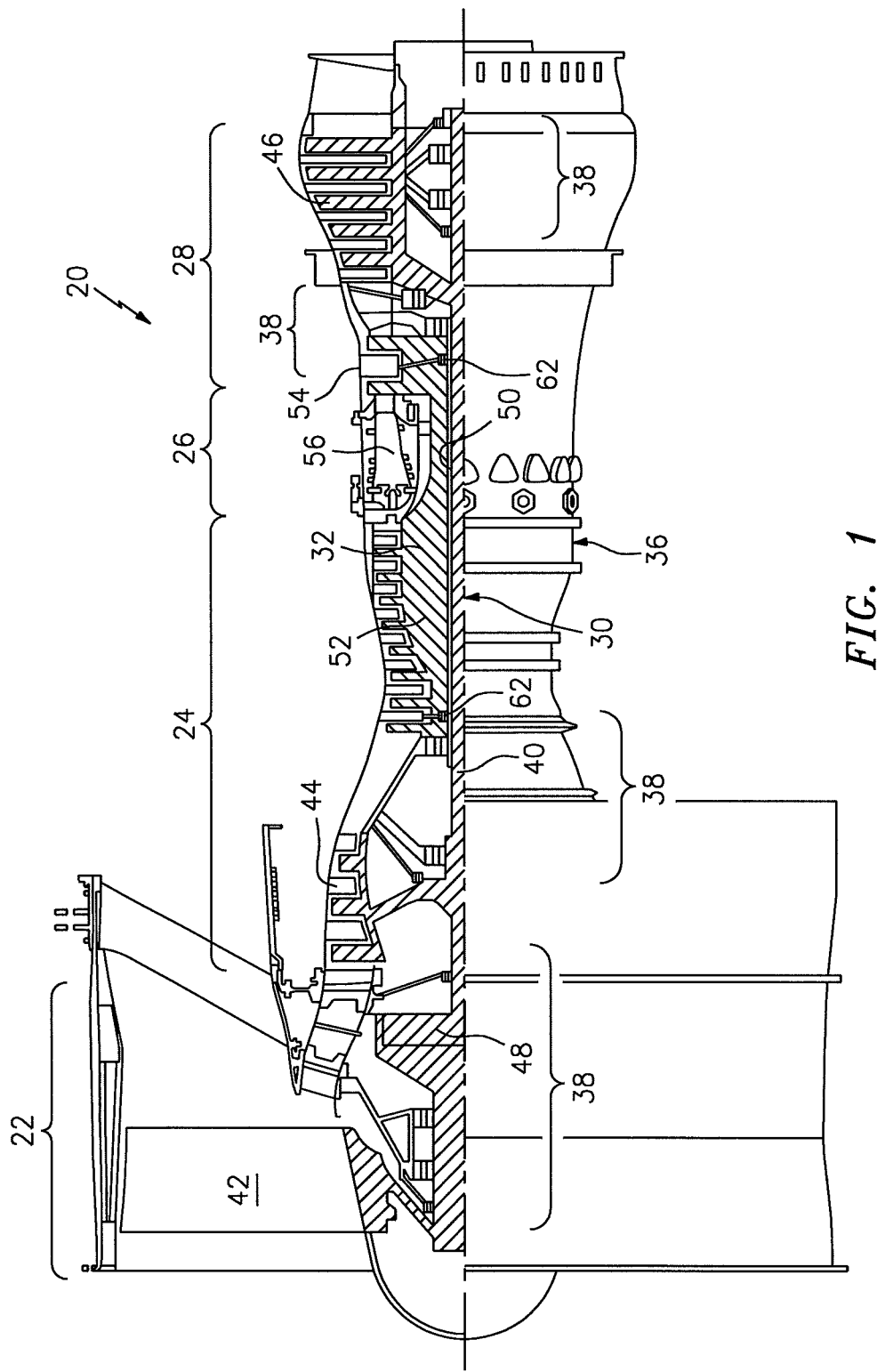
FIG. 1 is a schematic cross-section of an example gas turbine engine architecture.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine architectures might include an augmentor section and exhaust duct section (not shown) among other systems or features. The fan section 22 drives air along a bypass flowpath while the compressor section 24 drives air along a core flowpath for compression and communication into the combustor section 26 then expansion thru the turbine section 28. Although depicted as a turbofan in the disclosed non-limiting embodiment, it should be understood that the concepts described herein are not limited to use with turbofans as the teachings may be applied to other types of turbine engines such as a low bypass augmented turbofan, turbojets, turboshafts, and three-spool (plus fan) turbofans wherein an intermediate spool includes an intermediate pressure compressor ("IPC") between a Low Pressure Compressor ("LPC") and a High Pressure Compressor ("HPC"), and an intermediate pressure turbine ("IPT") between the high pressure turbine ("HPT") and the Low pressure Turbine ("LPT").

The engine 20 generally includes a low spool 30 and a high spool 32 mounted for rotation about an engine central longitudinal axis A relative to an engine static structure 36 via several bearing compartments 38. The low spool 30 generally includes an inner shaft 40 that interconnects a fan 42, a low pressure compressor 44 ("LPC") and a low pressure turbine 46 ("LPT"). The inner shaft 40 drives the fan 42 directly or thru a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor 52 ("HPC") and high pressure turbine 54 ("HPT"). A combustor 56 is arranged between the HPC 52 and the HPT 54. The inner shaft 40 and the outer shaft 50 are concentric and rotate about the engine central longitudinal axis A which is collinear with their longitudinal axes.

Core airflow is compressed by the LPC 44 then the HPC 52, mixed with fuel and burned in the combustor 56, then expanded over the HPT 54 and the LPT 46. The turbines 54, 46 rotationally drive the respective low spool 30 and high spool 32 in response to the expansion. The main engine shafts 40, 50 are supported at a plurality of points by the bearing compartments 38. It should be understood that various bearing compartments 38 at various locations may alternatively or additionally be provided.

In one example, the gas turbine engine 20 is a high-bypass geared aircraft engine with a bypass ratio greater than about six (6:1). The geared architecture 48 can include an epicyclic gear train, such as a planetary gear system or other gear system. The example epicyclic gear train has a gear reduction ratio of greater than about 2.3:1, and in another example is greater than about 2.5:1. The geared turbofan enables operation of the low spool 30 at higher speeds which can increase the operational efficiency of the LPC 44 and LPT 46 to render increased pressure in a relatively few number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be understood, however, that the above parameters are only exemplary of one embodiment of a geared architecture engine and that the present disclosure is applicable to other gas turbine engines including direct drive turbofans, where the rotational speed of the fan 42 is the same (1:1) of the LPC 44.

In one example, a significant amount of thrust is provided by the bypass flow path due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The relatively low Fan Pressure Ratio according to one example gas turbine engine 20 is less than 1.45. Low Corrected Fan Tip Speed is the actual fan tip speed divided by an industry standard temperature correction of ("T"/518.7)$^{0.5}$ in which "T" represents the ambient temperature in degrees Rankine. The Low Corrected Fan Tip Speed according to one example gas turbine engine 20 is less than about 1150 fps (351 m/s).

Figure 2:
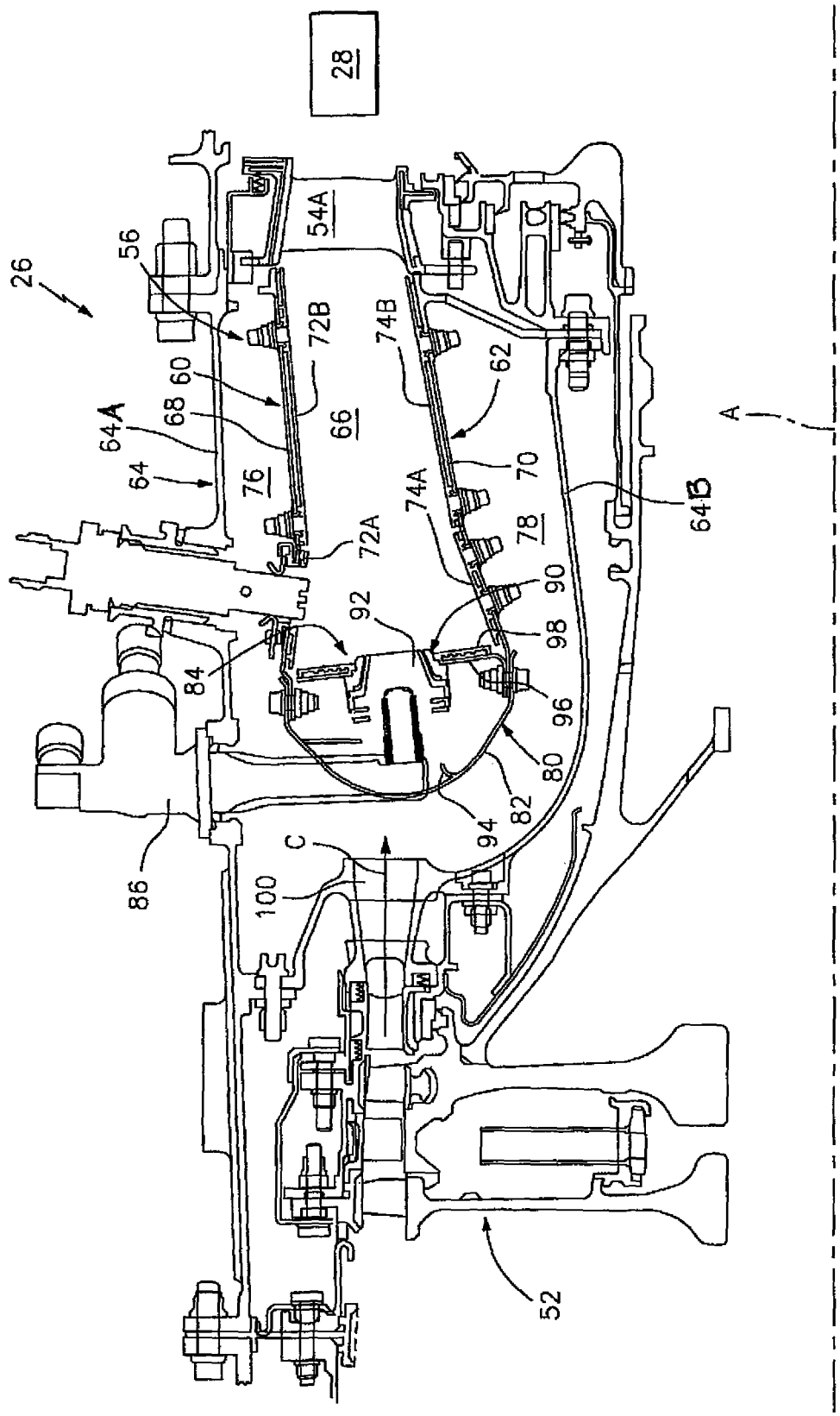
FIG. 2 is a partial expanded cross-section view of a hot section of a gas turbine engine shown in FIG. 1.

With reference to FIG. 2, the combustor 56 generally includes an outer combustor liner assembly 60, an inner combustor liner assembly 62 and a diffuser case module 64. The outer combustor liner assembly 60 and the inner combustor liner assembly 62 are spaced apart such that a combustion chamber 66 is defined there between. The combustion chamber 66 may be generally annular in shape.

The outer combustor liner assembly 60 is spaced radially inward from an outer diffuser case 64A of the diffuser case module 64 to define an outer annular plenum 76. The inner combustor liner assembly 62 is spaced radially outward from an inner diffuser case 64B of the diffuser case module 64 to define an inner annular plenum 78. It should be understood that although a particular combustor is illustrated, other combustor types with various combustor liner arrangements will also benefit herefrom. It should be further understood that the disclosed cooling flow paths are but an illustrated embodiment and should not be limited only thereto.

The combustor liner assemblies 60, 62 contain the combustion products for direction toward the turbine section 28. Each combustor liner assembly 60, 62 generally includes a respective support shell 68, 70 which supports one or more heat shields 72, 74 mounted to a hot side of the respective support shell 68, 70. Each of the heat shields 72, 74 may be generally rectilinear and manufactured of, for example, a nickel based super alloy, ceramic or other temperature resistant material and are arranged to form a liner array. In one disclosed non-limiting embodiment, the liner array includes a multiple of forward heat shields 72A and a multiple of aft heat shields 72B that are circumferentially staggered to line the hot side of the outer shell 68. A multiple of forward heat shields 74A and a multiple of aft heat shields 74B are circumferentially staggered to line the hot side of the inner shell 70.

The combustor 56 further includes a forward assembly 80 immediately downstream of the compressor section 24 to receive compressed airflow therefrom. The forward assembly 80 generally includes an annular hood 82, a bulkhead assembly 84, a multiple of fuel nozzles 86 (one shown) and a multiple of pre-swirlers 90 (one shown). Each of the pre-swirlers 90 is circumferentially aligned with one of a respective annular hood port 94 and projects thru the bulkhead assembly 84. The bulkhead assembly 84 generally includes a bulkhead support shell 96 secured to the combustor liner assembly 60, 62, and a multiple of circumferentially distributed bulkhead heat shields 98 secured to the bulkhead support shell 96 to define an opening 92 for each pre-swirler 90.

The annular hood 82 extends radially between, and is secured to, the forwardmost ends of the combustor liner assemblies 60, 62. Each fuel nozzle 86 may be secured to the diffuser case module 64 and project thru one of the hood ports 94 and the respective pre-swirler 90. Each of the multiple of circumferentially distributed hood ports 94 accommodates the respective fuel nozzle 86 to introduce air into the forward end of the combustion chamber 66 thru the pre-swirler 90.

The forward assembly 80 introduces core combustion air into the forward section of the combustion chamber 66 while the remainder enters the outer annular plenum 76 and the inner annular plenum 78. The multiple of fuel nozzles 86 and adjacent structure generate a blended fuel-air mixture that supports stable combustion in the combustion chamber 66.

Opposite the forward assembly 80, the outer and inner support shells 68, 70 are mounted to a first row of Nozzle Guide Vanes (NGVs) 54A in the HPT 54. The NGVs 54A are static components that direct the combustion gases onto the turbine blades of the first turbine rotor in the turbine section 28 to facilitate the conversion of pressure energy into kinetic energy. The combustion gases are also accelerated by the NGVs 54A because of their convergent shape and are typically given a "spin" or a "swirl" about axis A in the direction of turbine sections' rotation.

Figure 3:
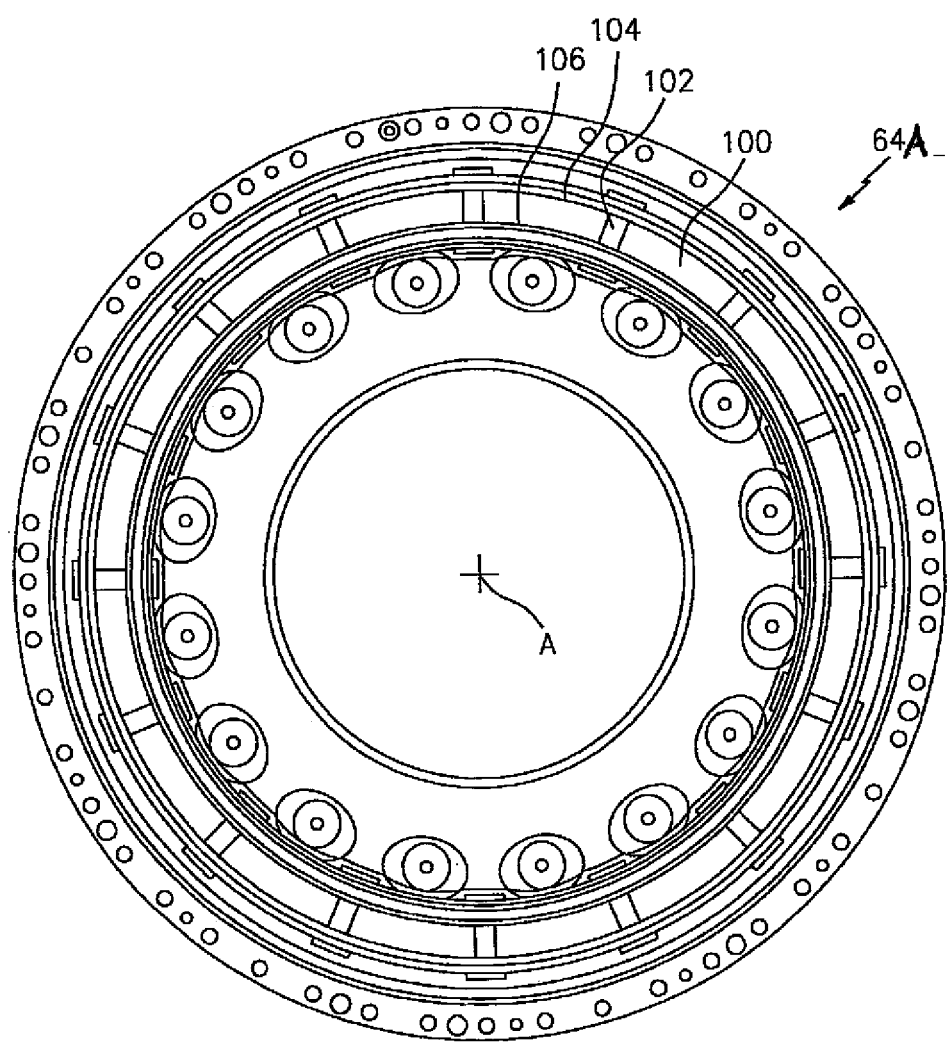
FIG. 3 is an expanded front view of a diffuser case of the combustor section.
Figure 4:
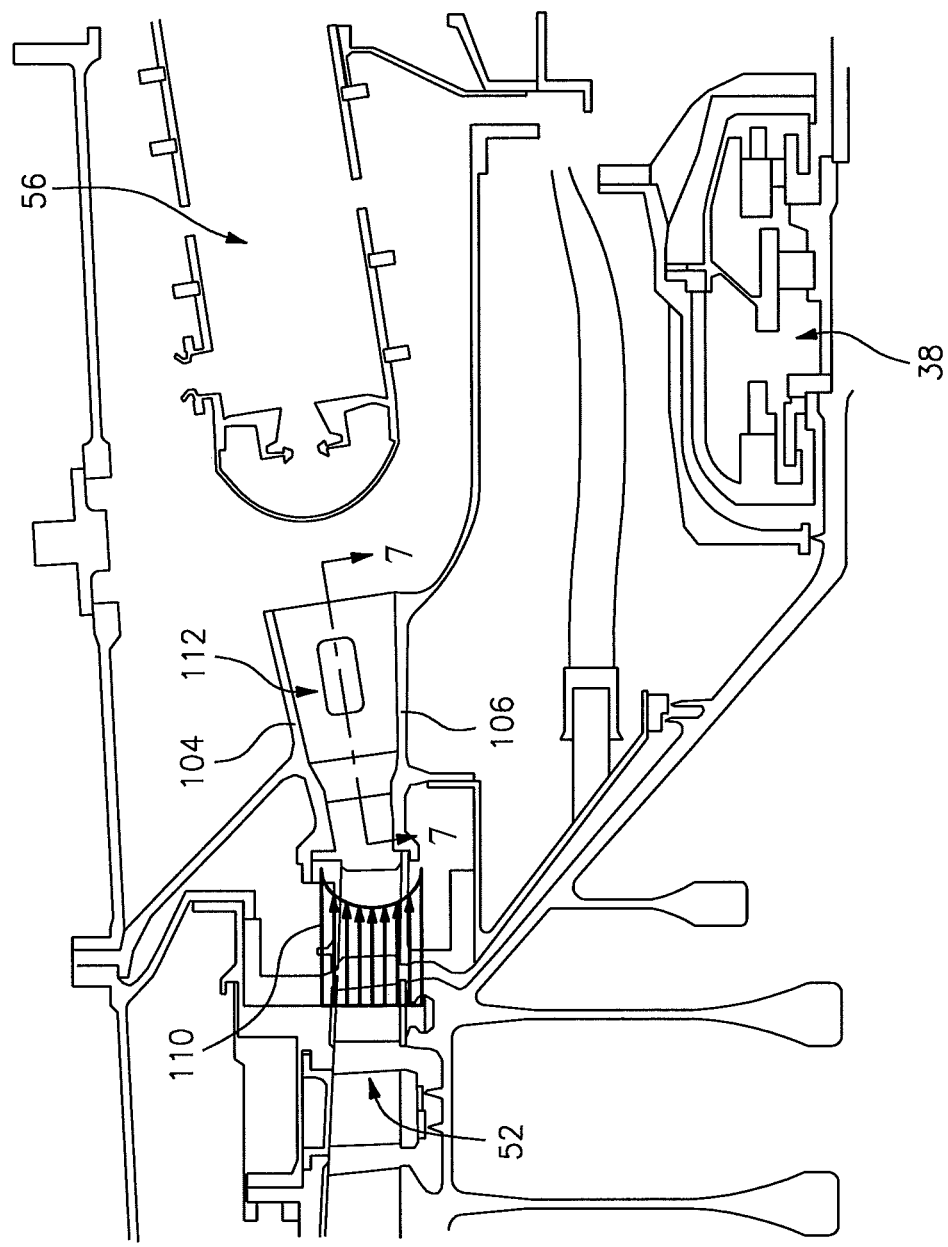
FIG. 4 is an expanded sectional view of a pre-diffuser strut according to one disclosed non-limiting embodiment.

The inner diffuser case 64B defines an annular flow path 100 for compressed airflow C from the upstream HPC 52. The annular flow path 100 includes a multiple of struts 102 which extend in a radial direction between an outer shroud 104 and an inner shroud 106 (also shown in FIG. 3). The annular flow path 100 defines a flowpath temperature profile (illustrated schematically at 110; FIG. 4) at the exit of the HPC 52 that is non-uniform, with a relatively cooler mid-span pre-diffuser airflow with respect to a relatively hotter outer diameter airflow adjacent to the outer shroud 104 and a relatively hotter inner diameter airflow adjacent to the inner shroud 106. It should be understood that the relatively longer arrows of the flow path temperature profile 110 correspond to relatively higher temperatures.

With reference to FIG. 4, the radially non-uniform airflow temperature profile 110 typically communicates with the combustor 56, however, increased turbine section 28 durability and/or the ability to withstand hotter turbine section 28 flowpath temperatures are readily achieved when the relatively cooler pre-diffuser mid-span airflow is directly tapped for use in other engine sections.

Figure 5:
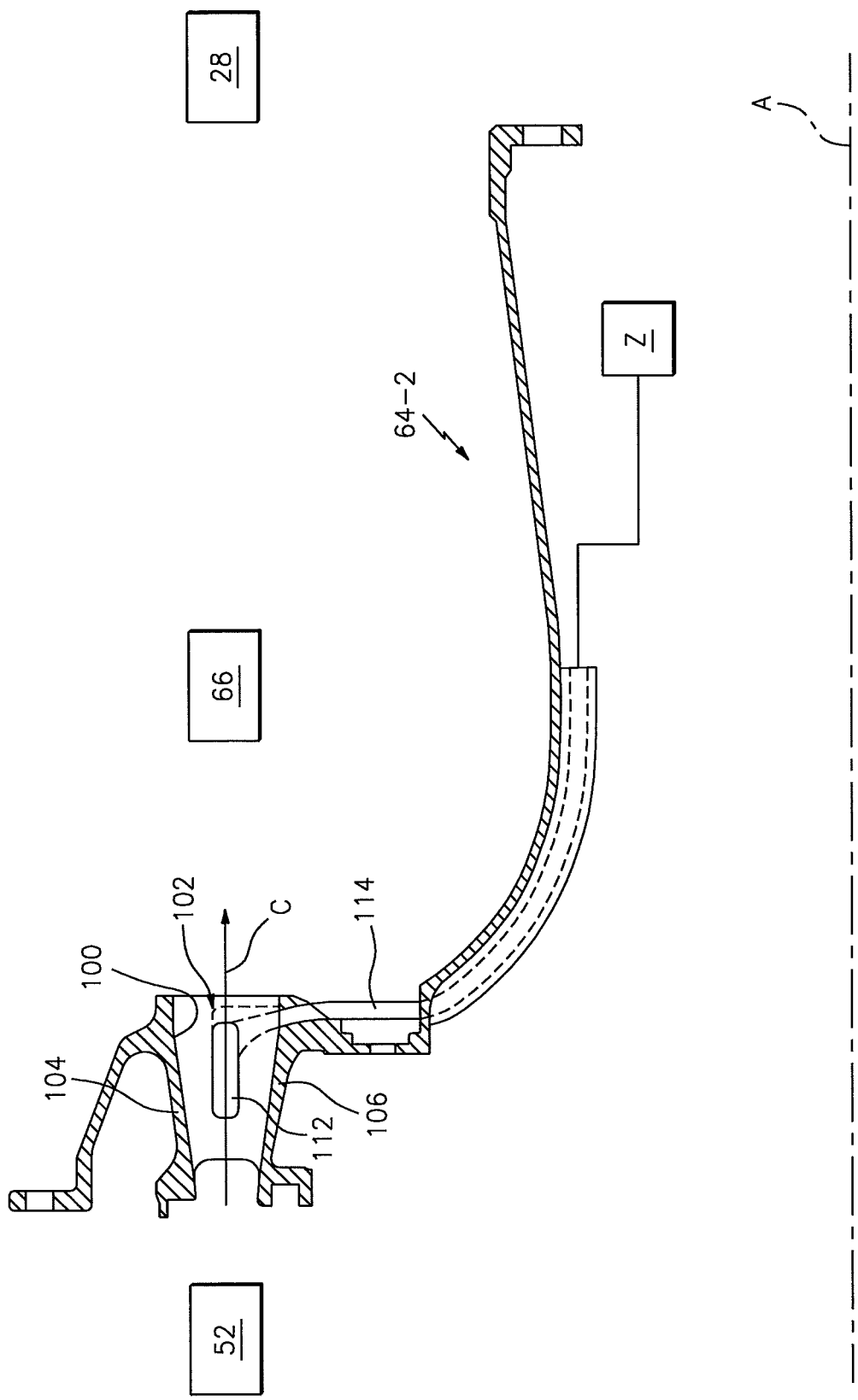
FIG. 5 is a cross-sectional view of an inner diffuser case with a manifold in communication with a pre-diffuser strut according to one disclosed non-limiting embodiment.

To tap the relatively cooler pre-diffuser airflow, a mid-span pre-diffuser inlet 112 is located between the shrouds 104, 106 generally parallel to the core airflow from the HPC 52 to collect and duct the relatively cooler mid-span airflow to desired regions Z within the engine 20 thru a manifold 114 (illustrated schematically; FIG. 5). The pre-diffusor inlet 112 may be parallel to an airflow from the HPC 52 and not necessarily parallel to the shrouds 104, 106. That is, the pre-diffuser inlet 112 may be oriented with respect to the airflow and not the associated hardware. As defined herein, mid-span is any radial location between the shrouds 104, 106 and is not to be limited to only the exact middle of the struts 102. The pre-diffuser inlet 112 may be selectively located radially along the strut 102 to essentially select from the airflow temperature profile 110. That is, the radial position may be predefined to tap a temperature tailored airflow. Oftentimes, even a relatively small temperature differential provides advantageous usage in other regions Z.

The manifold 114 as well as those that are hereafter described may be of various constructions and geometries to include but not limited to conduits as well as integral passageways within engine static structure such as the diffuser case 64. Furthermore, directional structures such as turning vanes and other guides may also be incorporated in the manifold 114 to minimize flow loss.

With reference to FIG. 5, the temperature tailored airflow tapped from the mid-span pre-diffuser inlet 112 may be communicated to the various regions Z within the engine 20 such as, for example only, the HPC 52, the combustor 56, the HPT 54 bearing compartments 38, or other engine architecture sections such as an exhaust duct section, an augmenter section, roll posts or other regions. That is, the non-uniform airflow temperature 110 is selectively tapped by radial location of the mid-span pre-diffuser inlet 112 to provide a temperature tailored airflow 111 (illustrated schematically) for communication to the desired region Z. The temperature tailored airflow 111 is thereby tailored in response to the radial tap position of the mid-span pre-diffuser inlet 112 along the span of the struts 102. Furthermore, the temperature tailored airflow 111 may be selectively communicated thru a heat exchanger to still further modify the temperature tailored airflow 111. It should be appreciated that all or only a portion of the temperature tailored airflow tapped from the mid-span pre-diffuser inlet 112 may be communicated thru the heat exchanger.

Figure 6:
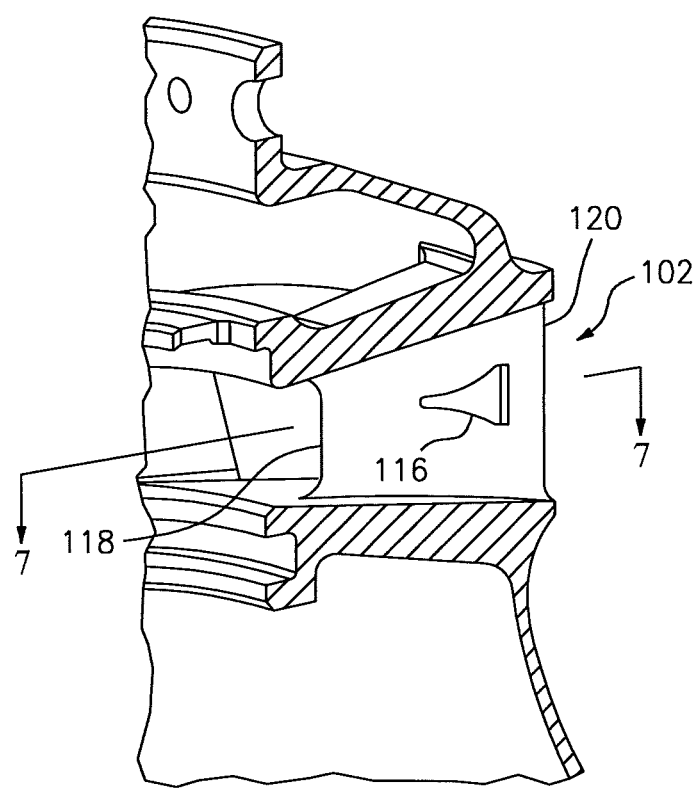
FIG. 6 is a radial cross-section of the inner diffuser illustrating an inlet according to one disclosed non-limiting embodiment.
Figure 7:
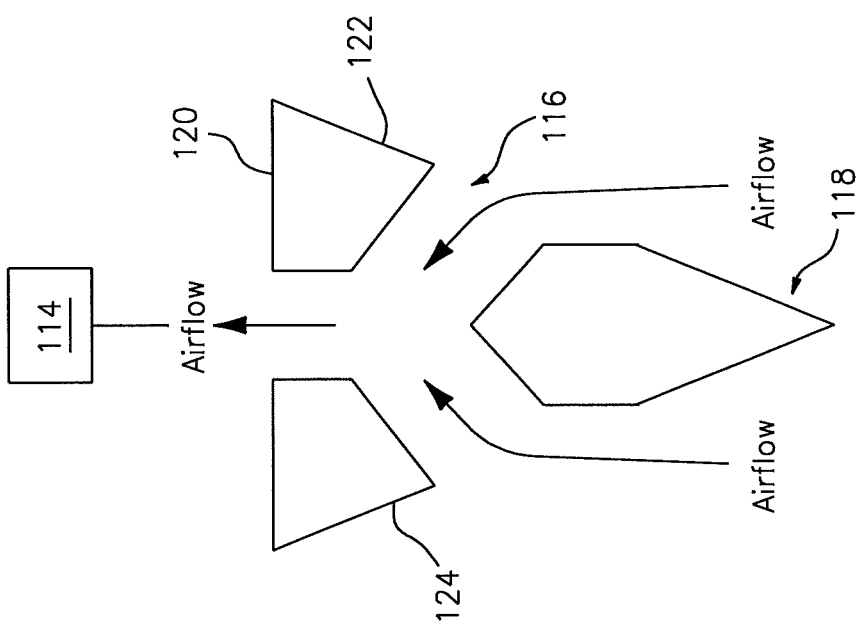
FIG. 7 is a cross-section thru the inlet strut of FIG. 6 along line 7-7.

With reference to FIG. 6, the struts 102 are defined by an outer airfoil wall surface 116 between a leading edge 118 and a trailing edge 120. The outer airfoil wall surface 116 may define a generally concave shaped portion to form a pressure side 122 and a generally convex shaped portion forming a suction side 124 (FIG. 7). It should be appreciated that various airfoil and non-airfoil shapes may alternatively be provided.

The mid-span pre-diffuser inlet 112 according to one disclosed non-limiting embodiment may include a flush wall NACA inlet 126 on either or both sides 122, 124 of one or more of the struts 102 (FIG. 7). That is, the flush wall NACA inlet 126 is located at least partially within the outer airfoil wall surface 116. A capacity of approximately 0%-2.5% of the airflow from the HPC 52 may be typically provided by each NACA inlet 121.

Figure 8:
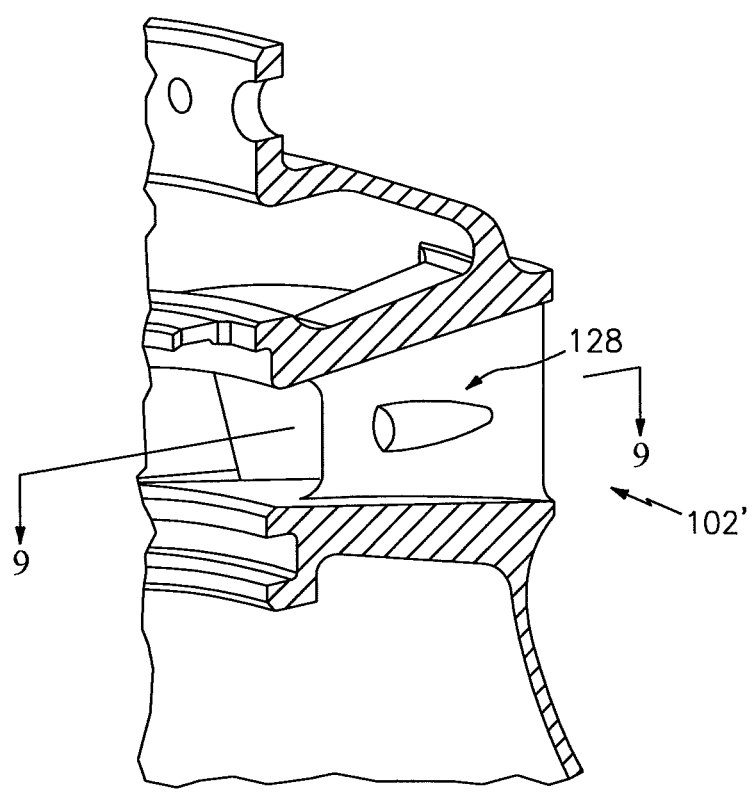
FIG. 8 is a radial cross-section of the inner diffuser illustrating an inlet according to another disclosed non-limiting embodiment.
Figure 9:
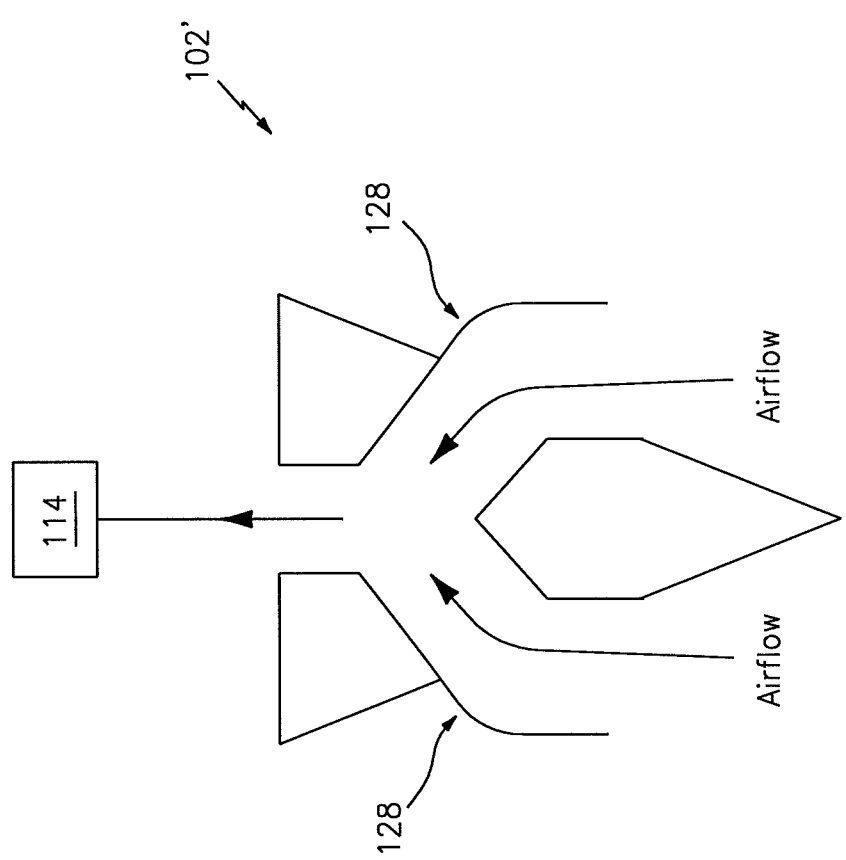
FIG. 9 is a cross-section thru the inlet strut of FIG. 8 taken along line 9-9.

With reference to FIG. 8, the mid-span pre-diffuser inlet 112 according to another disclosed non-limiting embodiment may include an enhanced capacity side-winged mid-span pre-diffuser RAM inlet 128 that extends from one or both sides of one or more struts 102' (FIG. 9). That is, the side-winged mid-span pre-diffuser RAM inlet 128 extends outward from the outer airfoil wall surface 116 to receive RAM airflow. A capacity of approximately 2.5%-5% of the airflow from the HPC 52 may be typically provided by each RAM inlet 128.

Figure 10:
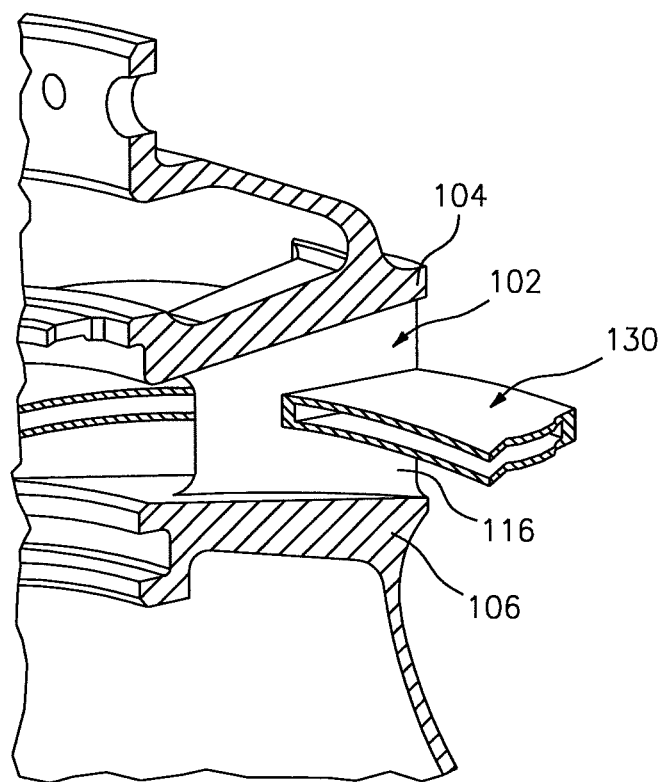
FIG. 10 is a radial cross-section of the inner diffuser of FIG. 11.
Figure 11:
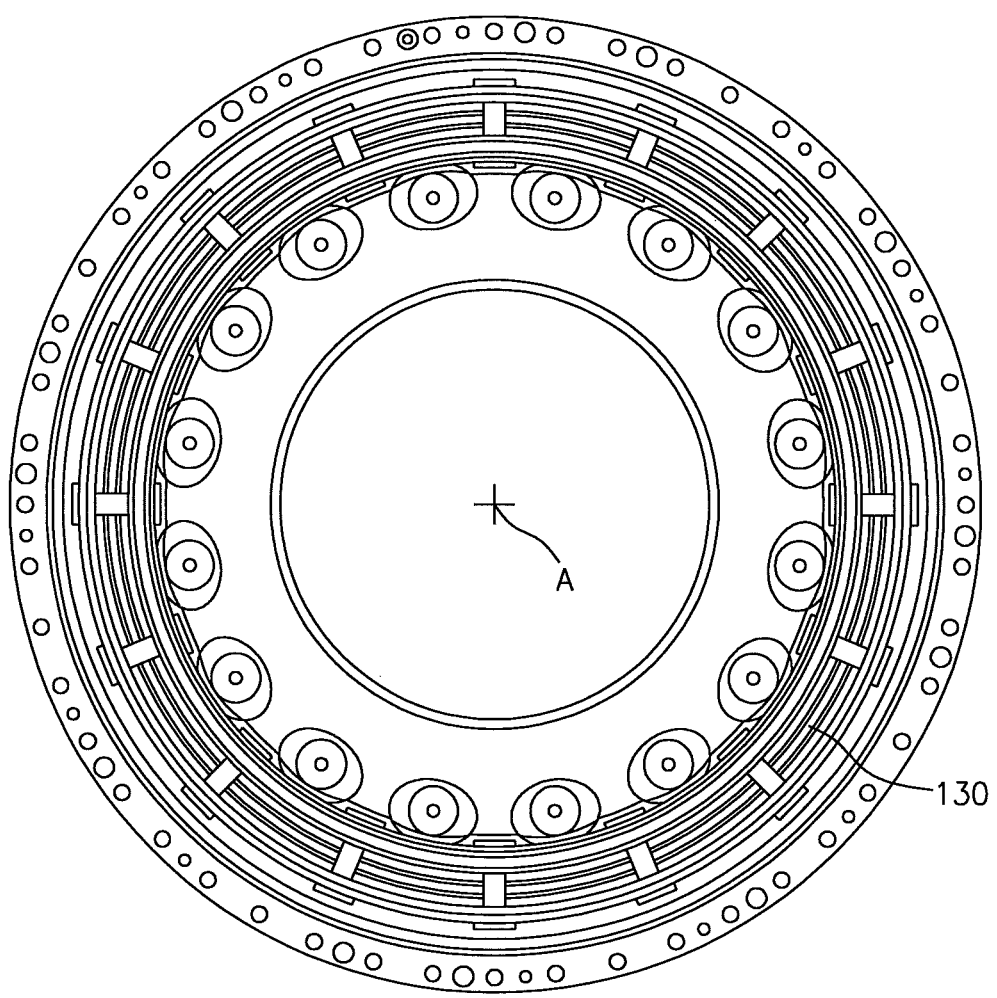
FIG. 11 is a front view of the inner diffuser of FIG. 10.

With reference to FIG. 10, the mid-span pre-diffuser inlet 112 according to another disclosed non-limiting embodiment may include an annular inlet 130 (also shown in FIG. 11). The annular inlet 130 is located circumferentially between the inlet struts 102 and radially between the outer and inner shrouds 104, 106. That is, the annular inlet 130 extends between the outer airfoil wall surface 116 of adjacent inlet struts 102 in a circumferentially segmented arrangement. Alternatively, the annular inlet 130 according to another disclosed non-limiting embodiment may extend between and at least partially thru the outer airfoil wall surface 116 in a substantially circumferentially continuous arrangement. A capacity of approximately 10%-20% of the airflow from the HPC 52 may be typically provided by annular inlet 130.

Figure 12:
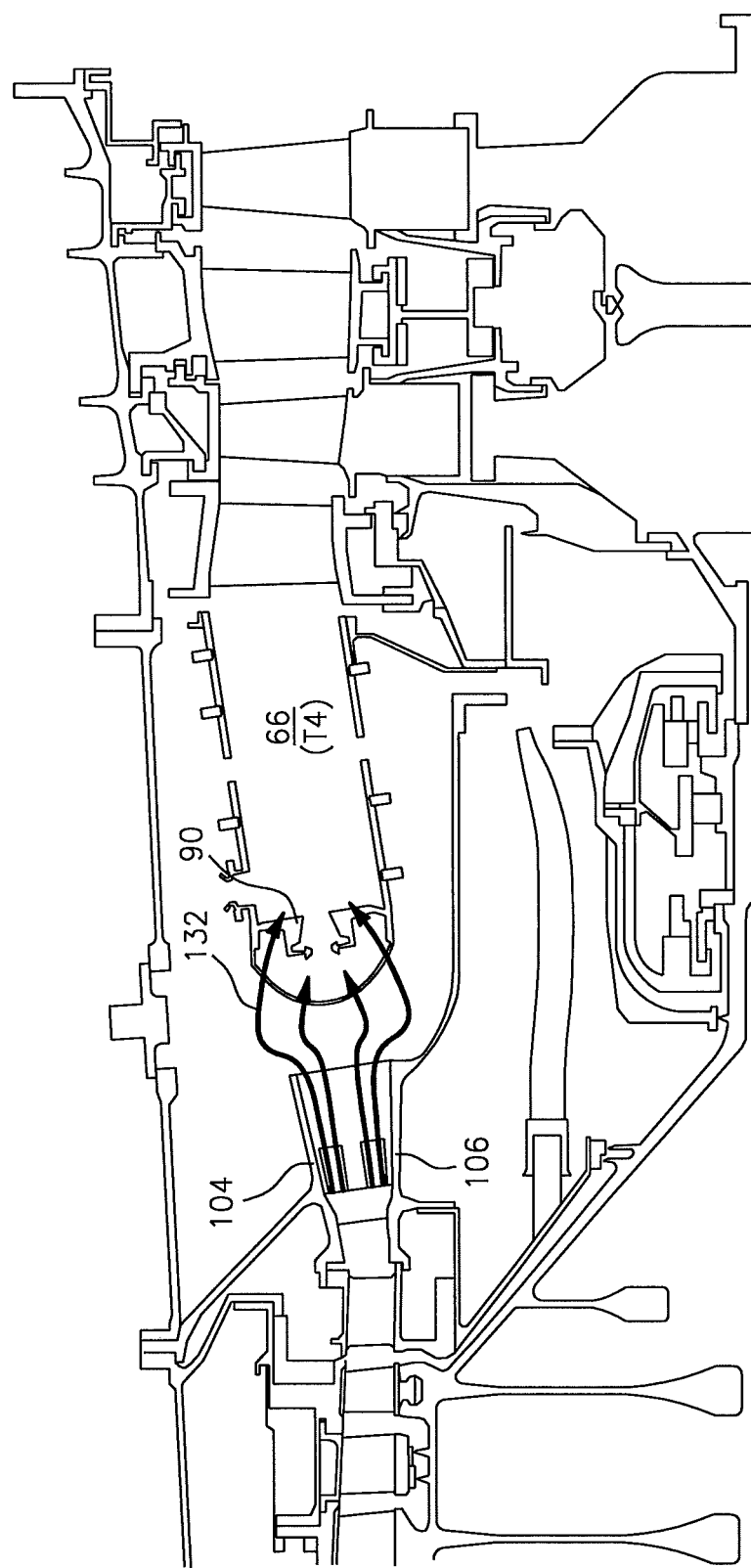
FIG. 12 is a schematic view of a gas turbine engine hot section illustrating an airflow communication scheme for fuel-nozzle pre-swirlers according to one disclosed non-limiting embodiment.

With reference to FIG. 12, the relatively hotter airflow from the outer diameter zone adjacent to the outer shroud 104 and the relatively hotter airflow from the inner diameter zone adjacent to the inner shroud 106 is directed by a pre-swirler manifold 132 (illustrated schematically by arrows) to the combustor fuel-nozzle pre-swirlers 90. A capacity of approximately 80% of the airflow from the HPC 52 may be provided hereby. Furthermore, by tapping the mid-span pre-diffuser airflow with the mid-span pre-diffuser inlets 112, the average temperature of the airflow provided to the fuel-nozzle pre-swirlers 90 even without the manifold 132 is relatively higher.

Provision of relatively hotter endwall air to the combustor fuel-nozzle pre-swirlers 90 facilitates a performance benefit as less fuel is required to heat the core airflow to a target level within the combustion chamber 66 referred to herein as T4. As further perspective, T1 is a temperature in front of the fan section 22; T2 is a temperature at the leading edge of the fan 42; T2.5 is the temperature between the LPC 44 and the HPC 52; T3 is the temperature aft of the LPC 44; T4 is the temperature in the combustion chamber 66; T4.5 is the temperature between the HPT 54 and the LPT 46; and T5 is the temperature aft of the LPT 46 (FIG. 1). The relatively hotter endwall air provided to the combustor fuel-nozzle pre-swirlers 90 may for example, provide an approximately 50° F. (10° C.) performance benefit.

Figure 13:
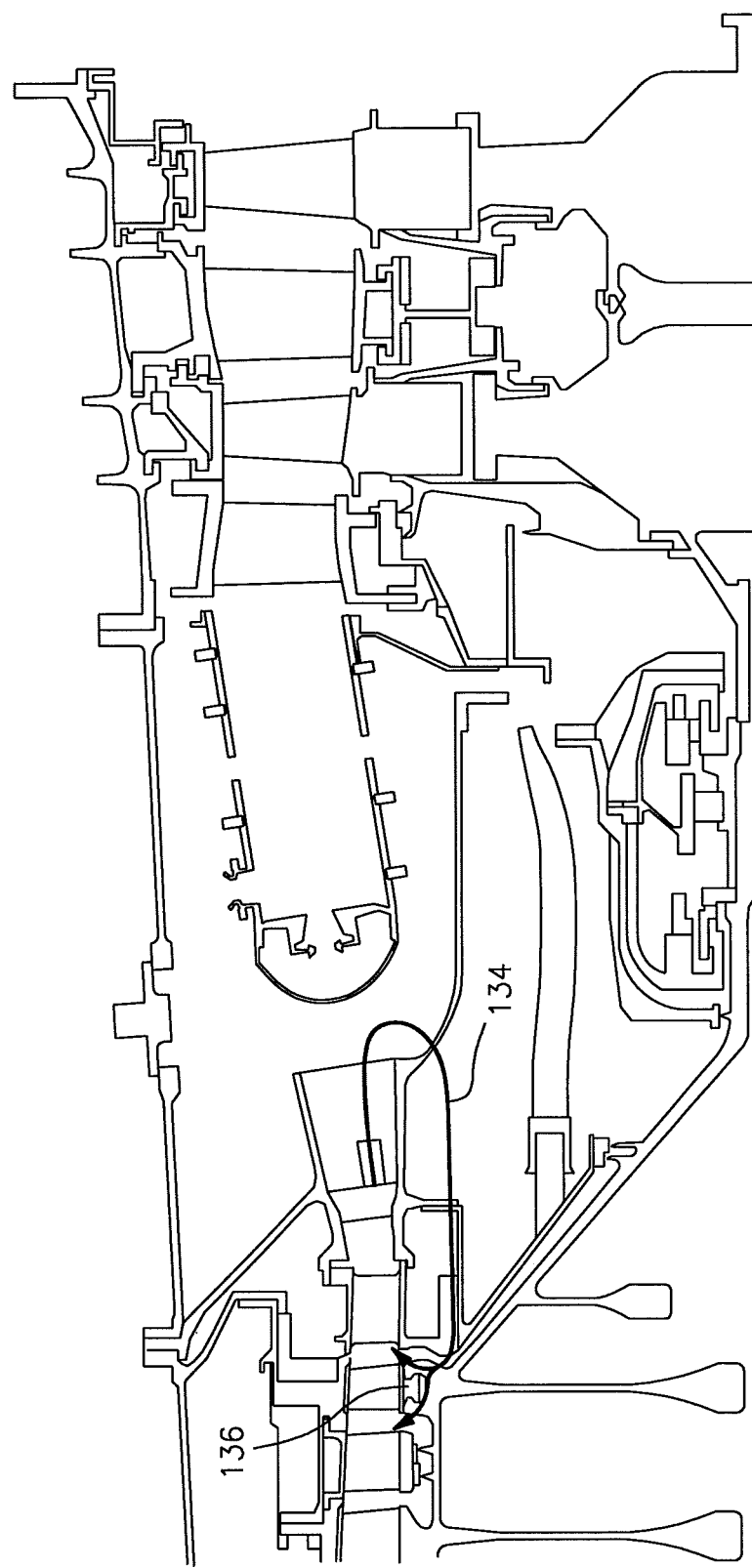
FIG. 13 is a schematic view of a gas turbine engine hot section illustrating an airflow communication scheme for a high pressure compressor (HPC) blade attachment hardware according to another disclosed non-limiting embodiment.

With reference to FIG. 13, according to another disclosed non-limiting embodiment, the relatively cooler mid-span airflow is communicated via a manifold 134 (illustrated schematically by an arrow) to HPC aft rotor blade attachments 136. The rear hub 138 may, in part, define the manifold 134. It should be appreciated, however, that various structures and airflow paths may alternatively or additionally be provided. Approximately 1%-1.5% of the airflow from the HPC 52 may be typically provided thru the manifold 134 to cool and purge the HPC aft rotor blade attachments 136.

Figure 14:
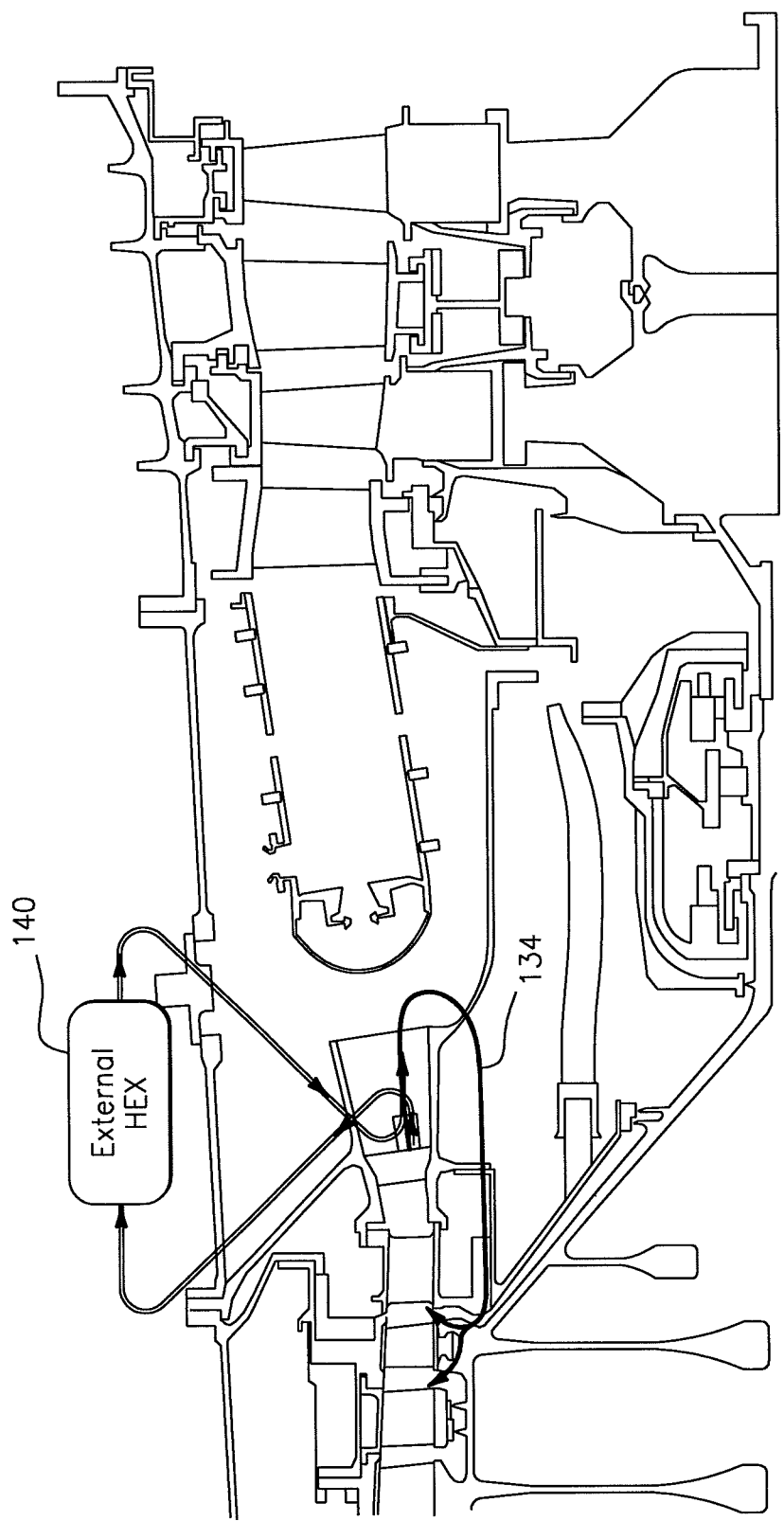
FIG. 14 is a schematic view of a gas turbine engine hot section illustrating an airflow communication scheme for HPC blade attachment hardware with a heat exchanger according to another disclosed non-limiting embodiment.

With reference to FIG. 14, according to another disclosed non-limiting embodiment, the relatively cooler mid-span airflow is first communicated thru a heat exchanger 140 prior to communication thru the manifold 134. The heat exchanger 140 further lowers the air temperature of the airflow from the HPC 52 which facilitates additional increases in turbine durability and/or gaspath temperature capability. It should be appreciated that the heat exchanger 140, and those that follow, may be selectively operable and located in various sections of the engine 20.

Figure 15:
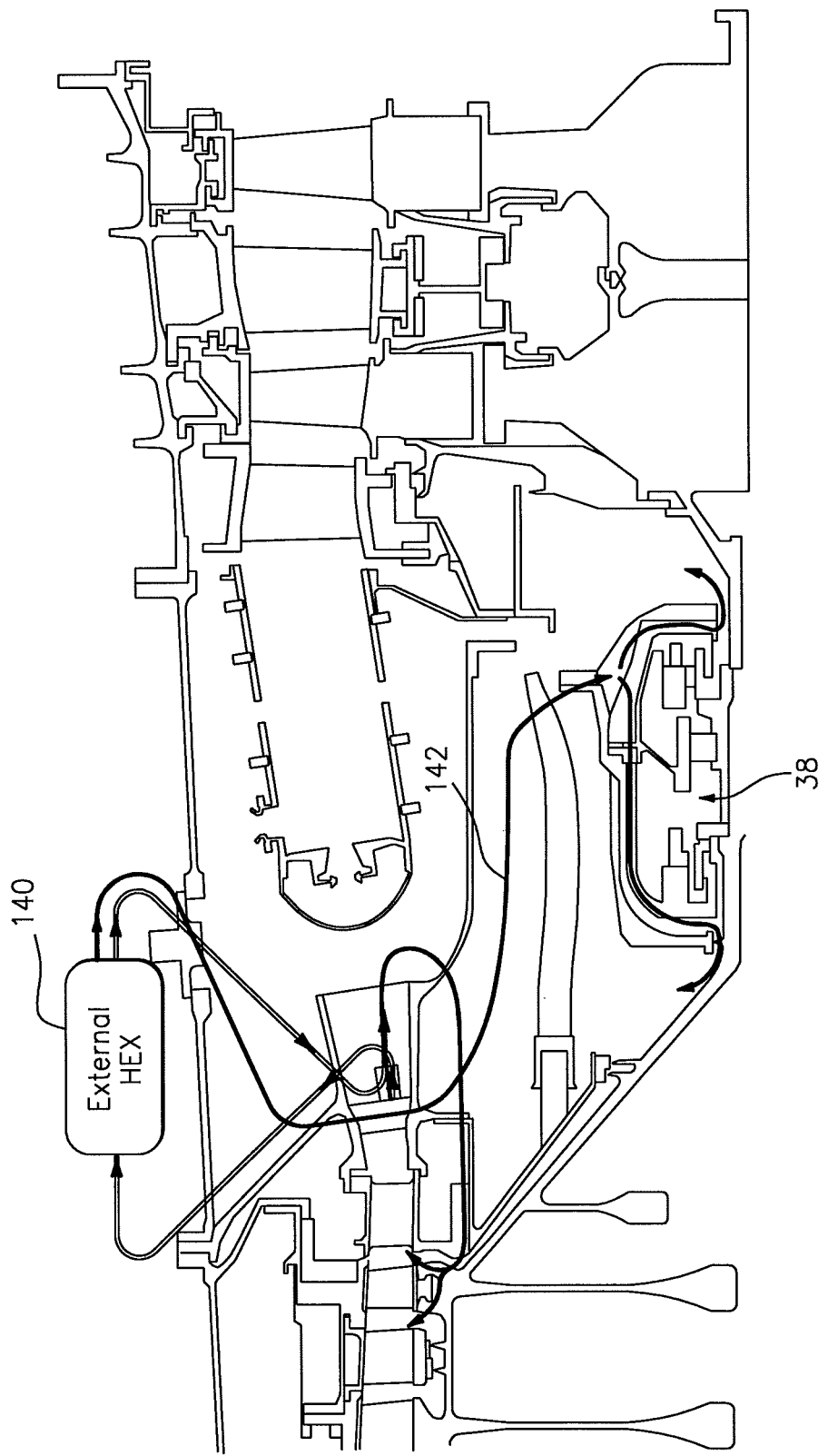
FIG. 15 is a schematic view of a gas turbine engine hot section illustrating an airflow communication scheme for HPC blade attachment hardware with a heat exchanger and buffer system according to another disclosed non-limiting embodiment.
Figure 16:
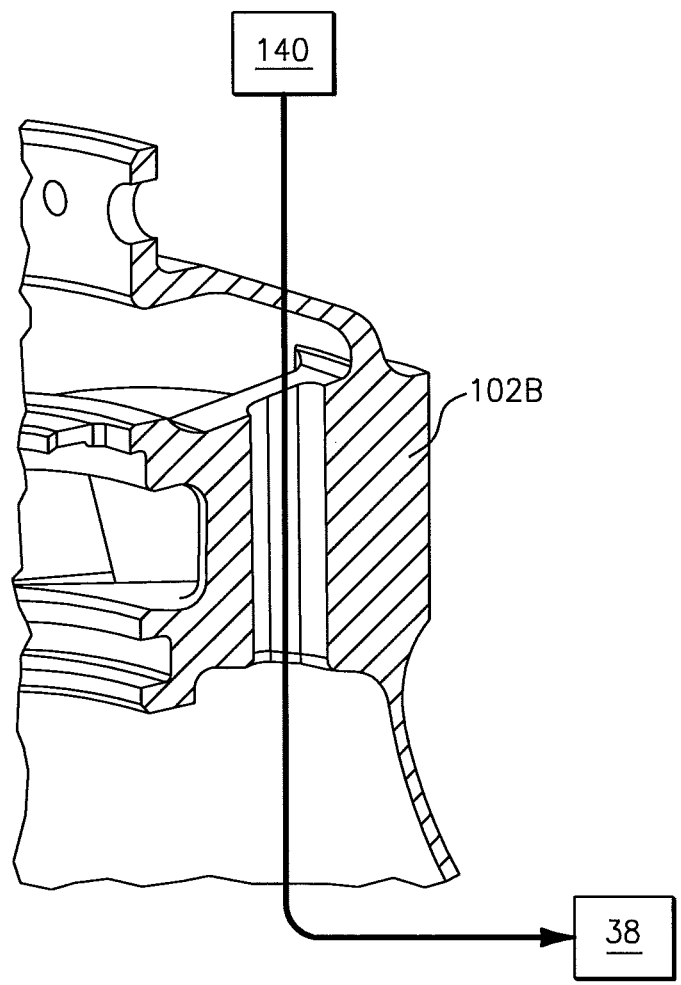
FIG. 16 is a radial cross-section of a strut with a buffer air passageway.

With reference to FIG. 15, according to another disclosed non-limiting embodiment, the airflow from the heat exchanger 140 may also be communicated as buffer air thru a buffer passage 142 (illustrated schematically by an arrow) to one or more bearing compartments 38. The buffer air maintains a positive differential pressure across seals in the bearing compartment 38 to facilitate a pneumatic pressure barrier to prevent undesired oil leakage therefrom. Approximately 0.25%-0.5% of the airflow from the HPC 52 may be provided as buffer air that is typically at temperatures of approximately 450° F. (232° C.). In one disclosed, non-limiting embodiment, the buffer passage 142 may pass spanwise thru one or more struts 102B (FIG. 16). It should be appreciated that any number of struts 102B will benefit herefrom. The struts 102B with the spanwise passage may or may not include mid-span pre-diffuser inlets 112.

Figure 17:
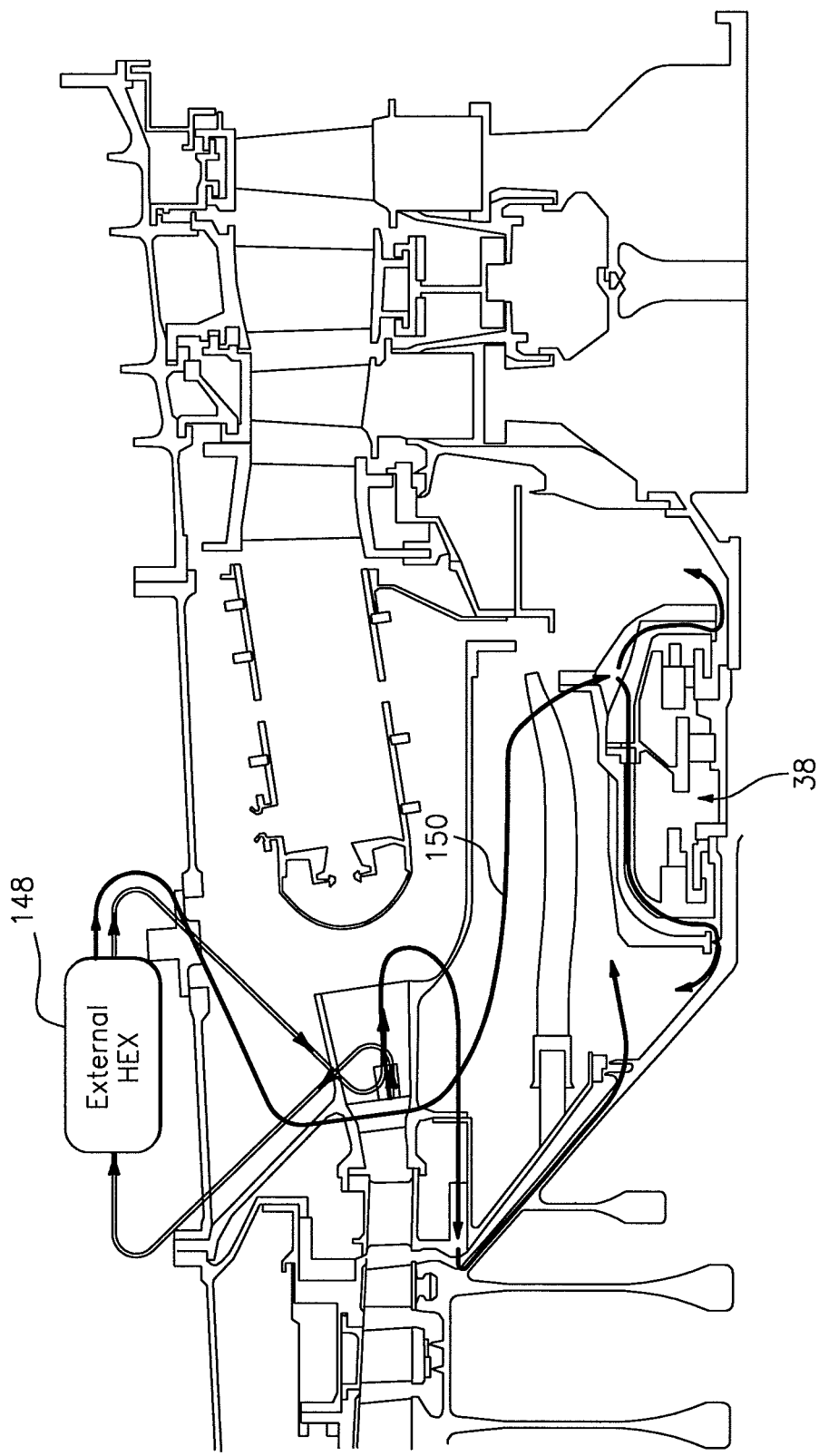
FIG. 17 is a schematic view of a gas turbine engine hot section illustrating an airflow communication scheme for HPC blade attachment hardware with a heat exchanger and buffer system according to another disclosed non-limiting embodiment.

With reference to FIG. 17, according to another disclosed non-limiting embodiment, the relatively cooler mid-span airflow is communicated via a manifold 144 (illustrated schematically by an arrow) to an HPC aft rotor hub 146. The HPC aft rotor hub 146 may, in part, define the manifold 144. It should be appreciated, however, that various structures and airflow paths may alternatively or additionally be provided.

In another disclosed non-limiting embodiment, the relatively cooler mid-span airflow is first communicated thru a heat exchanger 148 prior to communication thru the manifold 144 to further lower the air temperature of the airflow from the HPC 52 which facilitates additional increases in turbine durability and/or gaspath temperature capability.

In another disclosed non-limiting embodiment, the airflow from the heat exchanger 148 may also be communicated as buffer air thru a buffer passage 150 (illustrated schematically by an arrow) to one or more bearing compartments 38. Although the disclosed illustrated embodiments are directed to the final stages of the HPC 52, it should be appreciated that any number of stages will benefit herefrom as well as other engine sections such as the LPC 44 and other bearing compartments.

Figure 18:
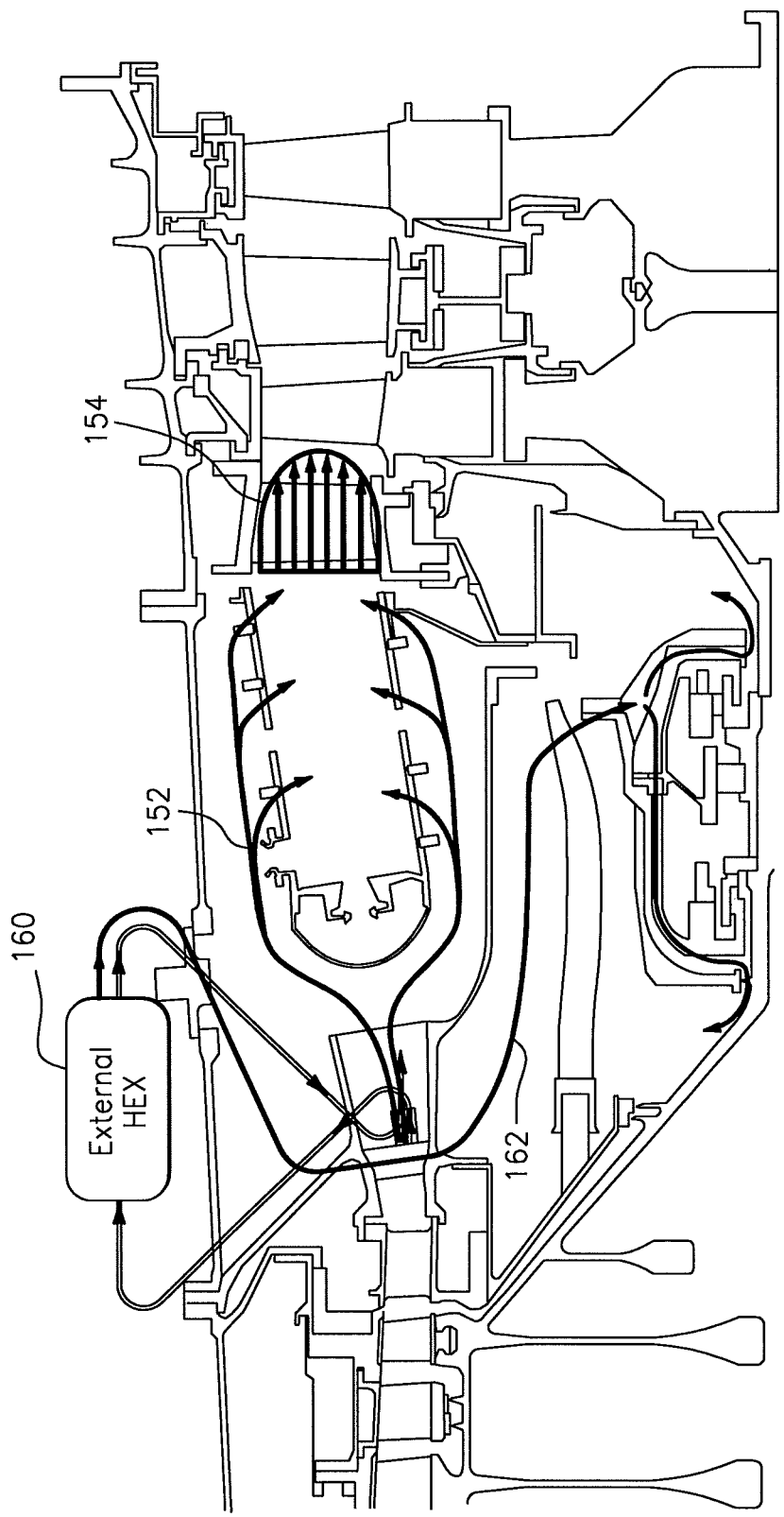
FIG. 18 is a schematic view of a gas turbine engine hot section illustrating an airflow communication scheme for a combustor with a heat exchanger and buffer system according to another disclosed non-limiting embodiment.

With reference to FIG. 18, according to another disclosed non-limiting embodiment, the relatively cooler mid-span airflow is communicated via a manifold 152 (illustrated schematically by arrows) to the combustor 56 to tailor the burner exit temperature profile 154 (illustrated schematically). That is, by selective direction and communication of the relatively cooler mid-span airflow to the combustor 56. For example, the quench flow typical of a Rich-Quench-Lean type combustor may be tailored such that the burner exit temperature profile 154 is the inverse of the airflow from the HPC 52. That is, the burner exit temperature profile 154 is non-uniform, with a relatively hotter annular mid-span zone with respect to a relatively cooler outer diameter zone adjacent to an outer shroud 156 of the NGVs 54A and a relatively hotter inner diameter zone adjacent to an inner shroud 158 of the NGVs 54A. It should be appreciated that various combustor types and exit temperature profiles will also benefit herefrom.

In another disclosed non-limiting embodiment, the relatively cooler mid-span airflow is first communicated thru a heat exchanger 160 prior to communication thru the manifold 152 to further lower the air temperature of the airflow from the HPC 52 which facilitates further control of the burner exit temperature profile 154.

In another disclosed non-limiting embodiment, the airflow from the heat exchanger 160 may also be communicated as buffer air thru a buffer passage 162 (illustrated schematically by an arrow) to one or more bearing compartments 38.

Figure 19:
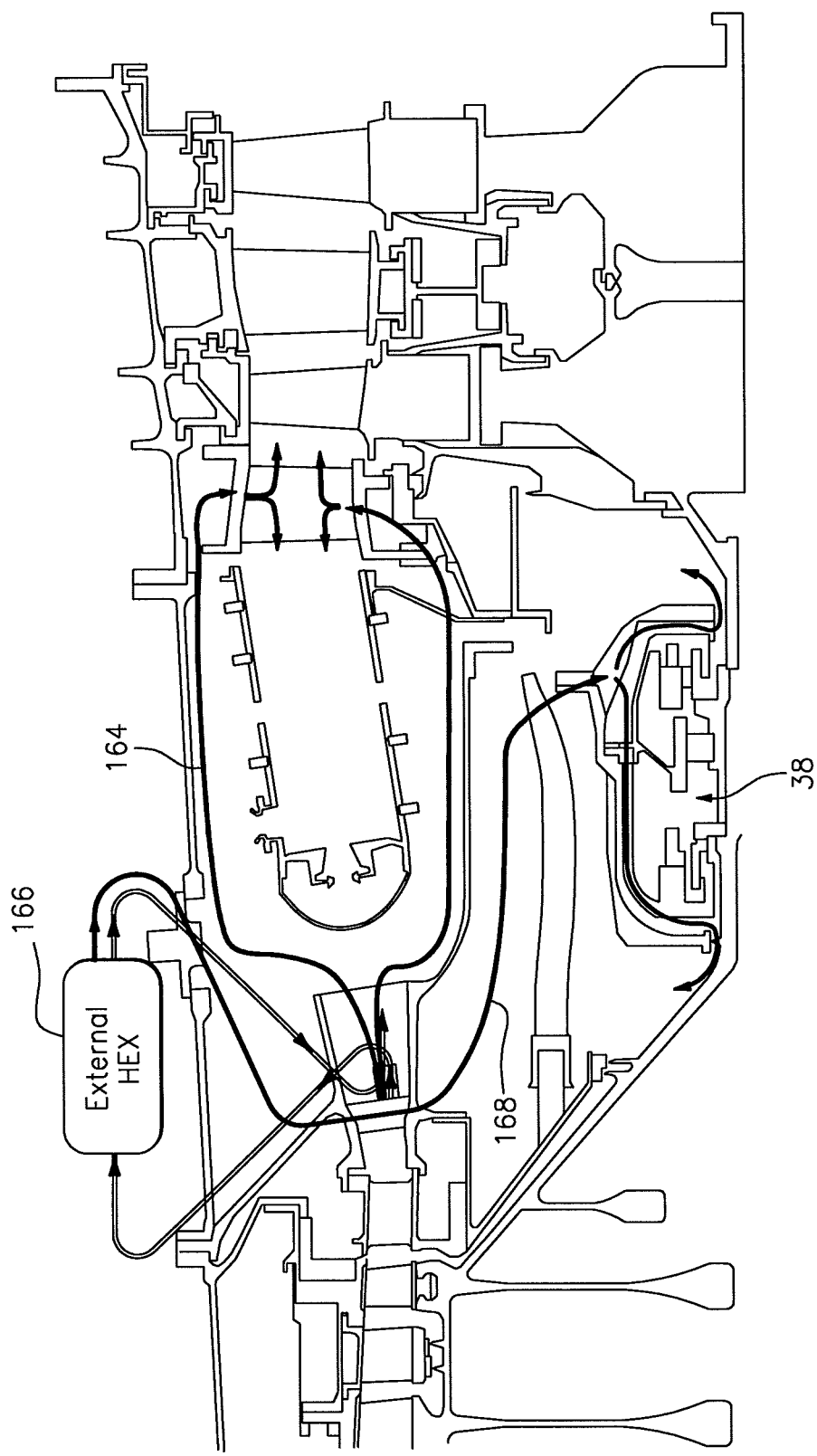
FIG. 19 is a schematic view of a gas turbine engine hot section illustrating an airflow communication scheme for HPT first vanes with a heat exchanger and buffer system according to another disclosed non-limiting embodiment.

With reference to FIG. 19, according to another disclosed non-limiting embodiment, the relatively cooler mid-span airflow is communicated via a manifold 164 (illustrated schematically by arrows) to the NGVs 54A which are also referred to as the 1st stage vanes of the HPT 54. The relatively cooler mid-span airflow may supply or otherwise supplement a secondary airflow to the NGVs 54A. That is, a mixed flow may be provided.

In another disclosed non-limiting embodiment, the relatively cooler mid-span airflow is first communicated thru a heat exchanger 166 prior to communication thru the manifold 164 to further lower the air temperature of the airflow from the HPC 52 which facilitates additional increases in turbine durability and/or gaspath temperature capability.

In another disclosed non-limiting embodiment, the airflow from the heat exchanger 166 may also be communicated as buffer air thru a buffer passage 168 (illustrated schematically by an arrow) to one or more bearing compartments 38.

Figure 20:
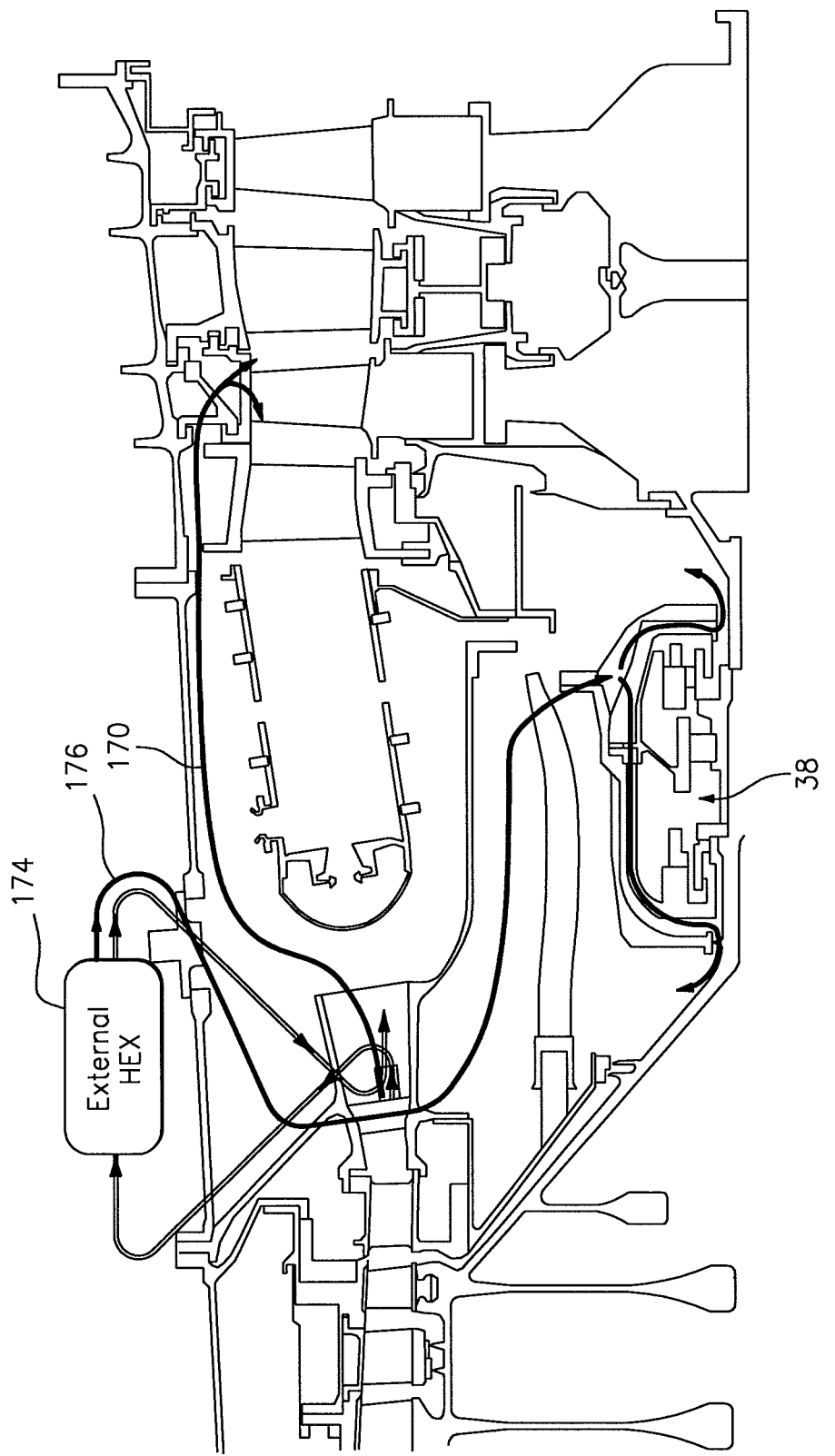
FIG. 20 is a schematic view of a gas turbine engine hot section illustrating an airflow communication scheme for a BOAS system with a heat exchanger and buffer system according to another disclosed non-limiting embodiment.

With reference to FIG. 20, according to another disclosed non-limiting embodiment, the relatively cooler mid-span airflow is communicated via a manifold 170 (illustrated schematically by an arrow) to a 1st stage blade outer air seal (BOAS) 172 of the HPT 54. The BOAS may be internally cooled with cooling air communicated into an outboard plenum of the BOAS 172 then pass thru passageways in the seal body and exit outlet ports thru an inboard side to provide film cooling. The relatively cooler mid-span airflow may also exit along the circumferential matefaces of the BOAS 172 so as to be vented into an adjacent inter-segment region to, for example, cool feather seals the adjacent BOAS segments.

In another disclosed non-limiting embodiment, the relatively cooler mid-span airflow is first communicated thru a heat exchanger 174 prior to communication thru the manifold 170 to further lower the air temperature of the airflow from the HPC 52 which facilitates additional increases in turbine durability and/or gaspath temperature capability.

In another disclosed non-limiting embodiment, the airflow from the heat exchanger 174 may also be communicated as buffer air thru a buffer passage 176 (illustrated schematically by an arrow) to one or more bearing compartments 38.

Figure 21:
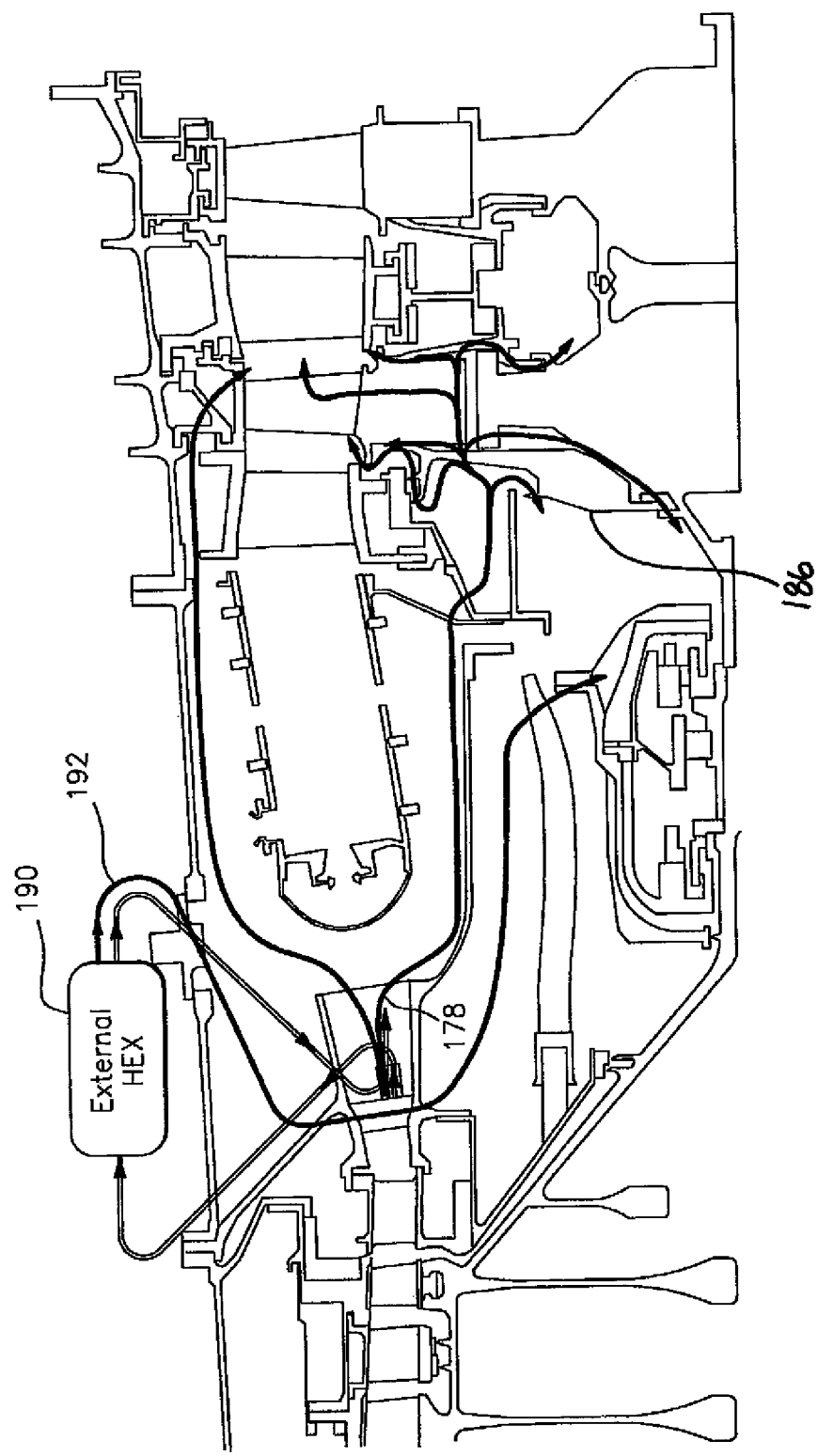
FIG. 21 is a schematic view of a gas turbine engine hot section illustrating an airflow communication scheme for HPT blade attachment hardware with a heat exchanger and buffer system according to another disclosed non-limiting embodiment.

With reference to FIG. 21, according to another disclosed non-limiting embodiment, the relatively cooler mid-span airflow is communicated via a manifold 178 (illustrated schematically by arrows) to 1st stage blades 180 of the HPT 54. The manifold 178 may communicate with a blade attachment region 182 of a rotor disk 184 that supports the blades 180. That is, the manifold 178 may communicate thru a rotor disk cover plate 186 to direct the relatively cooler mid-span airflow into the blade attachment region 182 and thence into the blades 180 thru respective root section thereof.

Furthermore, the manifold 178 may communicate with the rotor disk cover plate 186 thru a tangential on board injector (TOBI) 188. The TOBI 188 is often known by other names but generally includes annular spaced nozzles that impart a swirling moment to direct the airflow tangentially.

In another disclosed non-limiting embodiment, the relatively cooler mid-span airflow is first communicated thru a heat exchanger 190 prior to communication thru the manifold 178 to further lower the air temperature of the airflow from the HPC 52 which facilitates additional increases in turbine durability and/or gaspath temperature capability.

In another disclosed non-limiting embodiment, the airflow from the heat exchanger 190 may also be communicated as buffer air thru a buffer passage 192 (illustrated schematically by an arrow) to one or more bearing compartments 38.

Figure 22:
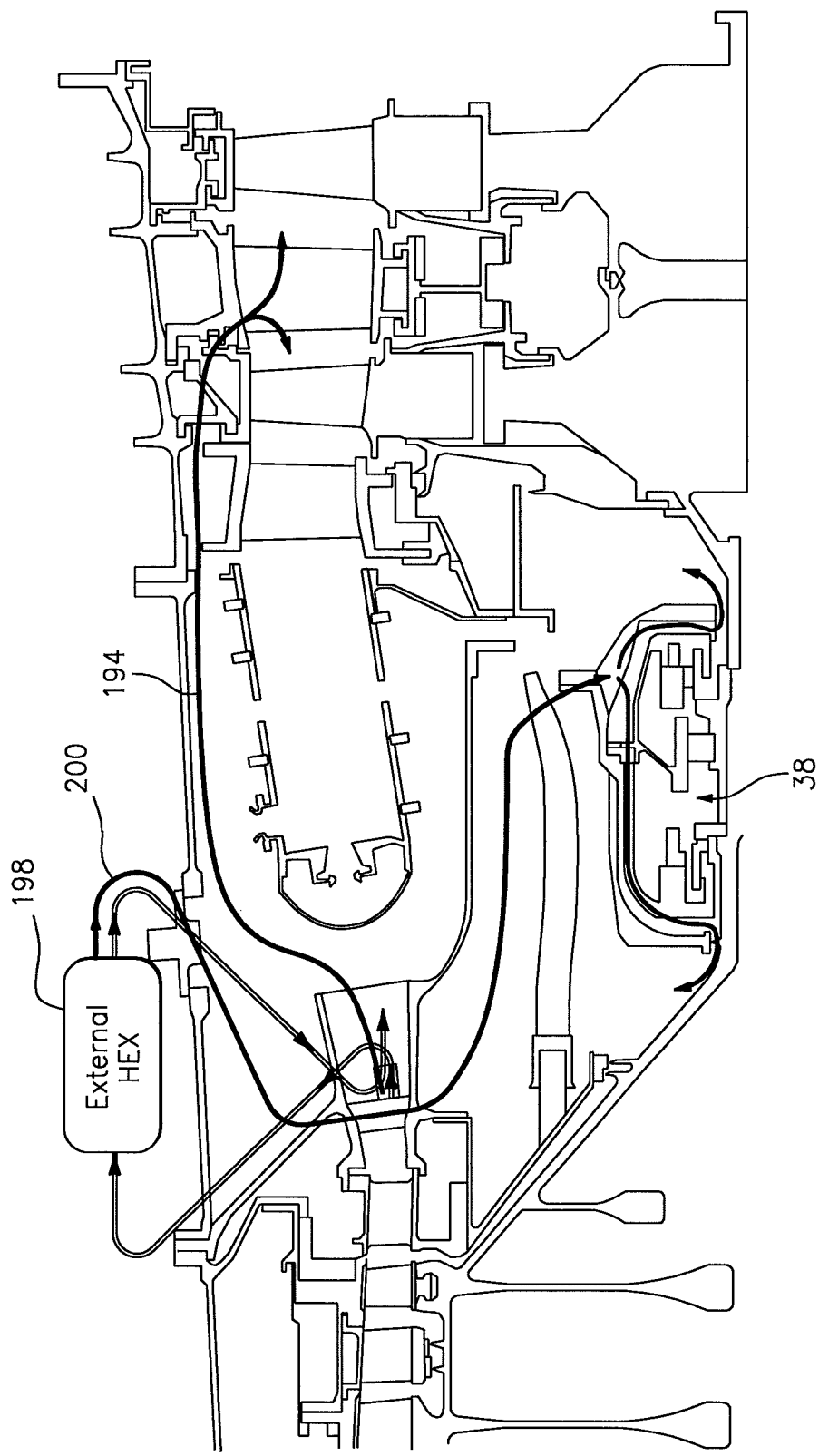
FIG. 22 is a schematic view of a gas turbine engine hot section illustrating an airflow communication scheme for HPT second stage vanes with a heat exchanger and buffer system according to another disclosed non-limiting embodiment.

With reference to FIG. 22, according to another disclosed non-limiting embodiment, the relatively cooler mid-span airflow is communicated via a manifold 194 (illustrated schematically by arrows) to 2nd stage vanes 196 of the HPT 54. The relatively cooler mid-span airflow may supply or otherwise supplement a secondary airflow to the 2nd stage vanes 196. Although the disclosed illustrated embodiments are directed to a two-stage HPT54, it should be appreciated that any number of stages will benefit herefrom as well as other engine sections such as the LPT 46.

In another disclosed non-limiting embodiment, the relatively cooler mid-span airflow is first communicated thru a heat exchanger 198 prior to communication thru the manifold 194 to further lower the air temperature of the airflow from the HPC 52 which facilitates additional increases in turbine durability and/or gaspath temperature capability.

In another disclosed non-limiting embodiment, the airflow from the heat exchanger 198 may also be communicated as buffer air thru a buffer passage 200 (illustrated schematically by an arrow) to one or more bearing compartments 38.

Figure 23:
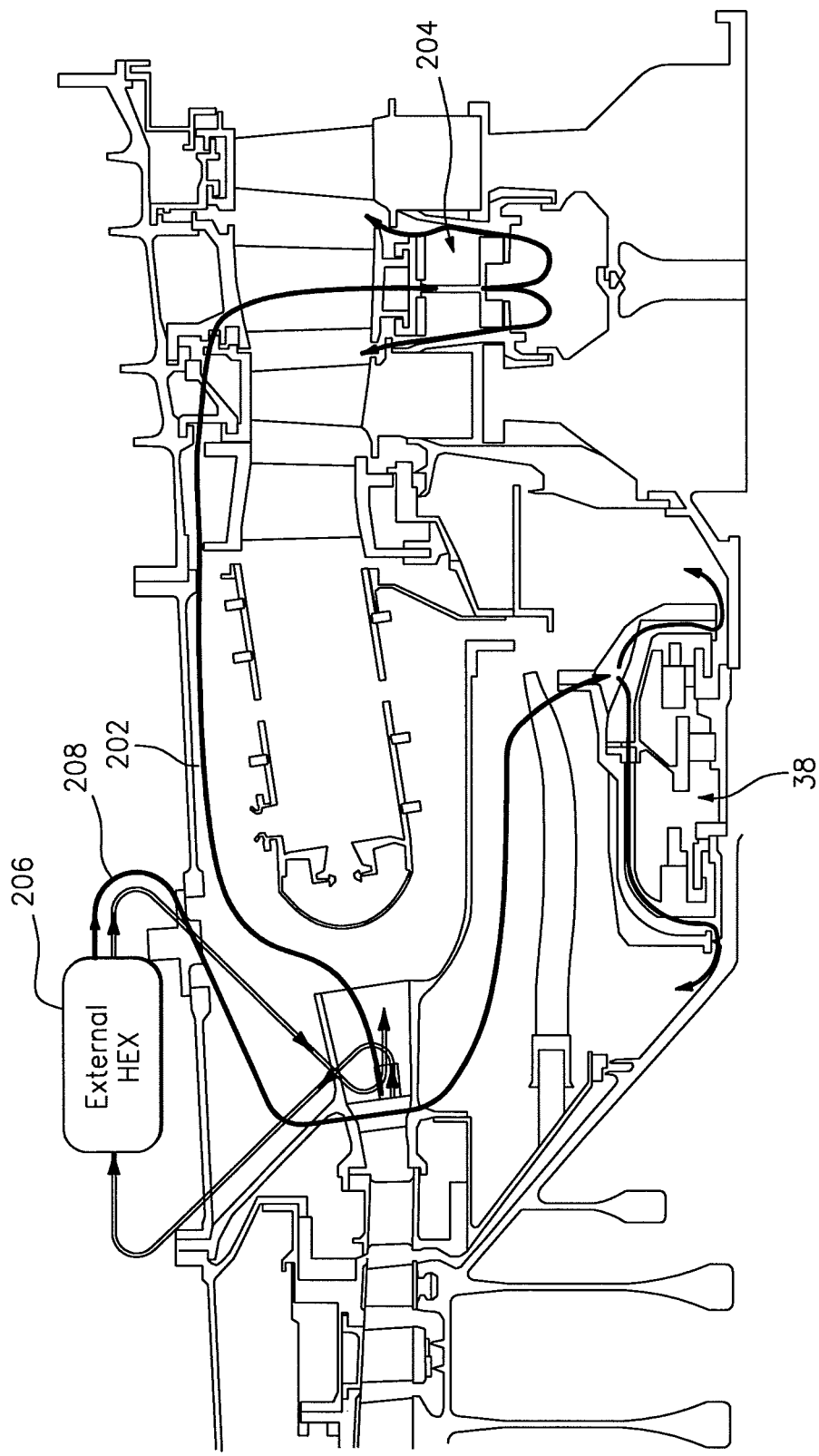
FIG. 23 is a schematic view of a gas turbine engine hot section illustrating an airflow communication scheme for HPT inter-stage seal hardware with a heat exchanger and buffer system according to another disclosed non-limiting embodiment.

With reference to FIG. 23, according to another disclosed non-limiting embodiment, the relatively cooler mid-span airflow is communicated via a manifold 202 (illustrated schematically by arrows) to the 1-2 seals 204 of the HPT 54. The relatively cooler mid-span airflow may supply or otherwise supplement a secondary airflow.

In another disclosed non-limiting embodiment, the relatively cooler mid-span airflow is first communicated thru a heat exchanger 206 prior to communication thru the manifold 202 to further lower the air temperature of the airflow from the HPC 52 which facilitates additional increases in turbine durability and/or gaspath temperature capability.

In another disclosed non-limiting embodiment, the airflow from the heat exchanger 206 may also be communicated as buffer air thru a buffer passage 208 (illustrated schematically by an arrow) to one or more bearing compartments 38.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A gas turbine engine with an axial centerline, comprising:
   a compressor section;
   a combustor section;
   a turbine section; and
   a diffuser case module;
   said diffuser case module comprising struts within an annular flow path from said compressor section to said combustor section, said struts spanning said annular flow path radially, at least one strut of said struts having a mid-span pre-diffuser inlet in communication with said annular flow path, wherein said mid-span pre-diffuser inlet receives a temperature tailored airflow from said annular flow path;
   said at least one strut having a respective leading edge, a respective trailing edge, and a respective pair of lateral sides extending axially from the respective leading edge to the respective trailing edge, wherein said mid-span pre-diffuser inlet opens to said annular flow path from at least one respective lateral side among the respective pair of lateral sides, said at least one strut further having a buffer passage extending axially from said mid-span pre-diffuser inlet axially through said respective trailing edge,
   a manifold in fluid communication with said mid-span pre-diffuser inlet, wherein said manifold provides said temperature tailored airflow from said buffer passage to said turbine section.

2. The gas turbine engine as recited in claim 1, wherein said manifold communicates said temperature tailored airflow to a high pressure turbine of said turbine section.

3. The gas turbine engine as recited in claim 1, wherein said manifold communicates with a blade attachment region of a rotor disk in said turbine section.

4. The gas turbine engine as recited in claim 1, wherein said manifold communicates with a row of vanes in said turbine section.

5. The gas turbine engine as recited in claim 1, wherein said manifold communicates with 1-2 seals in said turbine section.

6. A gas turbine engine with an axial centerline, comprising:
   a compressor section;
   a combustor section;
   a bearing compartment; and
   a diffuser case module;
   said diffuser case module comprising struts within an annular flow path from said compressor section to said combustor section, said struts spanning said annular flow path radially, at least one strut of said struts having a mid-span pre-diffuser inlet in communication with said annular flow path, wherein said mid-span pre-diffuser inlet receives a temperature tailored airflow from said annular flow path;
   said at least one strut having a respective leading edge, a respective trailing edge, and a respective pair of lateral sides extending axially from the respective leading edge to the respective trailing edge, wherein said mid-span pre-diffuser inlet opens to said annular flow path from at least one respective lateral side among the respective pair of lateral sides, said at least one strut further having a buffer passage extending axially from said mid-span pre-diffuser inlet axially through said respective trailing edge,
   a manifold in fluid communication with said mid-span pre-diffuser inlet, wherein said manifold provides said temperature tailored airflow from said buffer passage to said bearing compartment.

7. A gas turbine engine with an axial centerline, comprising:
   a compressor section;
   a combustor section;
   a heat exchanger; and
   a diffuser case module;
   said diffuser case module comprising struts within an annular flow path from said compressor section to said combustor section, said struts spanning said annular flow path radially, at least one strut of said struts having a mid-span pre-diffuser inlet in communication with said annular flow path, wherein said mid-span pre-diffuser inlet receives a temperature tailored airflow from said annular flow path;
   said at least one strut having a respective leading edge, a respective trailing edge, and a respective pair of lateral sides extending axially from the respective leading edge to the respective trailing edge, wherein said mid-span pre-diffuser inlet opens to said annular flow path from at least one respective lateral side among the respective pair of lateral sides, said at least one strut further having a buffer passage extending axially from said mid-span pre-diffuser inlet axially through said respective trailing edge,
a manifold in fluid communication with said mid-span pre-diffuser inlet, wherein said manifold provides said temperature tailored airflow from said buffer passage to said heat exchanger.

* * * * *